US012762947B2

(12) United States Patent
Sevin et al.

(10) Patent No.: US 12,762,947 B2
(45) Date of Patent: Oct. 13, 2026

(54) REPORTING METHOD WITHIN AN INTELLIGENT TRANSPORT SYSTEM

(71) Applicant: CANON KABUSHIKI KAISHA, Tokyo (JP)

(72) Inventors: Julien Sevin, Saint Aubin du Cormier (FR); Isabelle Morvan, Chantepie (FR); Eric Nassor, Thorigne-Fouillard (FR)

(73) Assignee: CANON KABUSHIKI KAISHA, Tokyo (JP)

( * ) Notice: Subject to any disclaimer, the term of this patent is extended or adjusted under 35 U.S.C. 154(b) by 185 days.

(21) Appl. No.: 18/565,480

(22) PCT Filed: May 30, 2022

(86) PCT No.: PCT/EP2022/064658
§ 371 (c)(1),
(2) Date: Nov. 29, 2023

(87) PCT Pub. No.: WO2022/253779
PCT Pub. Date: Dec. 8, 2022

(65) Prior Publication Data

US 2024/0257635 A1 Aug. 1, 2024

(30) Foreign Application Priority Data

Jun. 1, 2021 (GB) ..................................... 2107851
Jan. 14, 2022 (GB) ..................................... 2200486

(51) Int. Cl.
*G08G 1/01* (2006.01)

(52) U.S. Cl.
CPC ......... *G08G 1/0141* (2013.01); *G08G 1/0133* (2013.01)

(58) Field of Classification Search
CPC .... G08G 1/0141; G08G 1/0133; G08G 1/005; G08G 1/052; G08G 1/056; G08G 1/164; H04W 4/40; H04W 4/90; H04W 4/02
See application file for complete search history.

(56) References Cited

U.S. PATENT DOCUMENTS

2011/0018998 A1* 1/2011 Guzik .................... H04W 4/80 348/143
2018/0040246 A1* 2/2018 Yonemura ............ H04W 4/027
(Continued)

FOREIGN PATENT DOCUMENTS

EP 4073780 A1 10/2022
JP 2020113272 A 7/2020
(Continued)

OTHER PUBLICATIONS

ETSI TR 103 300-1 v2.1.3, Intelligent Transport System (ITS); Vulnerable Road Users (VRU) awareness; Part 1: Use Cases definition; Release 2, Feb. 2021, XP14391441.
(Continued)

*Primary Examiner* — Stephanie T Su
(74) *Attorney, Agent, or Firm* — Canon U.S.A., Inc. IP Division

(57) ABSTRACT

A method for transmitting a Collective Perception Message, CPM, the method being intended for an Intelligent Transport System, ITS, comprising at least one originating ITS station, ITS-S, the method comprising the following steps, at the at least one originating ITS-S: transmitting a CPM reporting information related to at least one object detected within an area monitored by the originating ITS-S; wherein the reported information comprises a safety-critical categorization information, indicating whether the detected object is critical for the safety of the monitored area.

21 Claims, 18 Drawing Sheets

(56) References Cited

U.S. PATENT DOCUMENTS

| | | | | |
|---|---|---|---|---|
| 2019/0339082 | A1* | 11/2019 | Doig | G01C 21/3841 |
| 2020/0126421 | A1* | 4/2020 | Zhang | H04W 4/44 |
| 2022/0174467 | A1* | 6/2022 | Lei | H04W 52/02 |

FOREIGN PATENT DOCUMENTS

| | | | |
|---|---|---|---|
| JP | 2021022866 | A | 2/2021 |
| WO | 2020/091088 | A1 | 5/2020 |
| WO | 2020257642 | A1 | 12/2020 |

OTHER PUBLICATIONS

ETSI TR 103 562 v2.2.1, Intelligent Transport System (ITS); Vehicular Communications; Basic Set of Applications; Analysis of the Collective Perception Service (CPS); Release 2, Dec. 2019, XP14360260.

ETSI TR 103 300-3 v2.1.1rev2, Intelligent Transport System (ITS); Vulnerable Road Users (VRU) awareness; Part 3: Specification of VRU awareness basic service; Release 2, Feb. 2021, XP14391691.

Draft ETSI TR 103 439 v0.0.9, Intelligent Transport Systems (ITS); Multi-Channel Operation Study; Release 2, Apr. 2021, XP14415439.

* cited by examiner

| Predetermined safety rules | Type | Class | Speed | Dynamic Status | Direction | Safety-critical categorization level | Safety-critical categorization level field |
|---|---|---|---|---|---|---|---|
| pedestrian on the sidewalk | sidewalk | pedestrian | | Dynamic/static | | no | 0 |
| bicycle riding in right way in a cycle path | cycle path | bicycle | <20 km/h | dynamic | | no | 0 |
| bicycle on the sidewalk < 5 km/h | sidewalk | bicycle | < 5 km/h | N.A | | no | 0 |
| bicycle riding in right way in a street | street | bicycle | <25 km/h | dynamic | | no | 0 |
| Bicycle/motorcycle riding on the sidewalk > 5 km/h | sidewalk | bicycle motorcycle | > 5 km/h | dynamic | | yes | 1 |
| pedestrian on the cycle path | cycle path | pedestrian | | Dynamic/static | | yes | 1 |
| bicycle riding in right way in a street >40km/h | street | bicycle | >40km/h | dynamic | | yes | 1 |
| Motorcycle/bicycle riding in right way in a street >50km/h | street | bicycle motorcycle | >40km/h | dynamic | | yes | 1 |
| Bicycle/motorcycle/pedestrian stopped in the inside a street | street | pedestrian bicycle animals | | static | | yes | 1 |
| Bicycle/motorcycle riding in wrong way in a cycle path | cycle path | bicycle | | dynamic | wrong way | yes | 1 |
| Bicycle/motorcycle riding in wrong way in a street | street | bicycle | | dynamic | wrong way | yes | 1 |
| Pedestrian/Animal crossing a street out pedestrian | street | Animal pedestrian | | dynamic | | yes | 1 |
| Bicycle/motorcycle not stopping at a red light | street | bicycle | | dynamic | wrong way | yes | 1 |

Figure 2

| Octet | Bit position | Permission item | Bit value |
|---|---|---|---|
| 1 | 0 | Safety Report | 0 : certificate not allowed to sign<br>1 : certificate allowed to sign |

REPORTING METHOD WITHIN AN INTELLIGENT TRANSPORT SYSTEM

CROSS REFERENCE TO RELATED APPLICATION

This application is the National Phase application of PCT Application No. PCT/EP2022/064658, filed on May 30, 2022. This application claims the benefit under 35 U.S.C. § 119 (a)-(d) of United Kingdom Patent Application No. 2107851.4, filed on Jun. 1, 2021 and entitled "REPORTING METHOD WITHIN AN INTELLIGENT TRANSPORT SYSTEM", and of United Kingdom Patent Application No. 2200486.5, filed on Jan. 14, 2022 and entitled "REPORTING METHOD WITHIN AN INTELLIGENT TRANSPORT SYSTEM". The above cited patent applications are incorporated herein by reference in its entirety.

FIELD OF THE INVENTION

The present invention relates generally to Intelligent Transport Systems (ITS) and more specifically to Cooperative Intelligent Transport Systems (C-ITS).

BACKGROUND OF INVENTION

Cooperative Intelligent Transport Systems (C-ITS) is an emerging technology for future transportation management that aims at improving road safety, traffic efficiency and drivers experience.

Intelligent Transport Systems (ITS), as defined by the European Telecommunications Standards Institute (ETSI), include various types of communication such as:

- communications between vehicles (e.g., car-to-car), and
- communications between vehicles and fixed locations (e.g., car-to-infrastructure).

C-ITS are not restricted to road transport as such: more generally, C-ITS may be defined as the use of information and communication technologies (ICT) for rail, water and air transport, including navigation systems. Such various types of C-ITSs generally rely on radio services for communication and use dedicated technologies.

Such C-ITS systems are subject to standards, specified for each country and/or territory where C-ITS systems are implemented. Today in Europe, the European Telecommunications Standards Institute (ETSI) is in charge of the elaboration of the specifications forming the standards to which C-ITS systems are subjected.

Cooperation within the C-ITSs is achieved by exchange of messages, referred as to ITS messages, among ITS stations (denoted ITS-S). The ITS-S may be vehicles, Road Side Units (RSU), Vulnerable Road Users (VRU) carrying an ITS equipment (for instance included in a smartphone, a GPS, a smart watch or in a cyclist equipment), or any other entities or infrastructures equipped with an ITS equipment, as well as central subsystems (back-end systems and traffic management centres).

ITSs may support various types of communications, for instance between vehicles (vehicle-to-vehicle), V2V), referring to all kinds of road users, e.g. car-to-car, or between vehicles and fixed locations such as vehicle-to-infrastructure, V2I, and infrastructure-to-vehicle, I2V, e.g., car-to-infrastructure.

Such messages exchanges may be performed via a wireless network, referred to as V2X (for "vehicle" to any kind of devices) networks, examples of which may include 3GPP LTE-Advanced Pro, 3GPP 5G or IEEE 802.11p technology.

Currently, in ETSI TS 103 324, a new awareness service is specified referred to as Cooperative Awareness Service. Such a service allows the transmission of description information (e.g. position and/or kinematic information) about objects detected by on board sensor systems embedded in ITS stations. This information is transmitted through ITS messages referred to as Collective Perception Messages (CPM).

Such CPMs are well adapted for a RSU embedded in a fixed road side entity which a specific area using its embedded sensors. At the current stage of the standard, CPMs are used for reporting objects present in the specific area, individually, without any further information.

Nevertheless, in case where the monitored specific area is a safety sensible area, only description information regarding the detected objects, such as their position and speed relatively to the RSU, are provided within the CPM. In case of abnormal situation or when a detected object may constitute a risk for the safety of the monitored area, each receiving neighbouring station analyses the risk individually through its received CPMs.

Indeed, as explained before, RSU only reports detected objects using CPMs to its neighboring stations, regardless of whether the object put at risk the safety of the area. Therefore, receiving these messages, the potential critical safety analysis is performed by each receiving station, which individually determines the safety risk level.

Such analysis thus takes place, at receiving stations, after the complete processing of the received CPMs. Such analysis is therefore time consuming and reduces the time to activate emergency procedures in case where a safety risk is identified at the receiving station(s).

There is therefore a need to implement a system that reduces this processing time in order to preserve the safety of the monitored area.

SUMMARY OF THE INVENTION

The present invention has been devised to address one or more of the foregoing concerns.

According to a first aspect of the invention there is provided a method for transmitting a Collective Perception Message, CPM, the method being intended for an Intelligent Transport System, ITS, comprising at least one originating ITS station, ITS-S, the method comprising the following steps, at the at least one originating ITS-S:

- transmitting a CPM reporting information related to at least one object detected within an area monitored by the originating ITS-S;
- wherein the reported information comprises a safety-critical categorization information, indicating whether the detected object is critical for the safety of the monitored area.

Therefore, such a method enables an ITS-S to provide safety-critical categorization information for certain detected objects to the other ITS-S of the ITS.

Thus, thank to this safety-critical categorization information, receiving stations may quickly determine whether the safety of the monitored area is at risk (i.e., as said earlier, if an object, in the monitored area, constitutes a safety risk), and, furthermore, which object detected by fixed road side entity 120 is the source of this safety issue.

Correspondingly, it is further provided an ITS station, ITS-S, within an Intelligent Transport System, ITS, the originating ITS-S comprising:

- one or more embedded sensors, configured to monitor a given area in order to detect objects;
- an analytical module configured to process data provided by the sensors in order to provide a list of detected objects in the monitored area;
- a safety-critical categorization module configured to process the list of detected objects in order to provide a safety-critical categorization information related to each detected object;
- a communication module configured to transmit a Collective Perception Message, CPM, comprising information related to at least one of the detected objects in the monitored area, wherein the information related to at least one of the detected objects comprises the associated safety-critical categorization information provided by the safety-critical categorization module.

Further, it is also provided a method for processing a Collective Perception Message, CPM, the method being intended for an Intelligent Transport System, ITS, comprising at least one originating ITS station, ITS-S, and at least one receiving ITS-S, the method comprising the following steps, at the at least one receiving ITS-S:

- receiving a CPM reporting information related to at least one object detected within an area monitored by the originating ITS-S;
- retrieving, from the reported information, a safety-critical categorization information, indicating whether the object is critical for the safety of the monitored area;
- determining whether the object is categorized as critical for the safety of the monitored area.

Optional features of embodiments of the first aspect of the invention are defined in the appended claims. Features formulated in the appended claims with reference to a method can be transposed into system features dedicated to any device according to embodiments of the invention.

According to some embodiments, the detected object may be reported individually when the detected object is categorized as critical for the safety of the monitored area.

According to some embodiments, previously to the transmitting step, the method may further comprise, when the detected object is not categorized as critical for the safety of the monitored area:

- determining whether the detected object may be reported with at least one another detected object not categorized as critical for the safety of the monitored area thereby forming a group of detected objects, according to predefined grouping rules;
- wherein the CPM reporting information related to the detected object is reported within said group, according to the determining step.

According to some embodiments, previously to the transmitting step, the method may further comprise:

- determining the safety-critical categorization information of the detected object;
- determining at least one another detected object with which the detected object may be reported according to predefined grouping rules,
- wherein the at least one another detected object is associated with a safety-critical categorization information identical to the determined safety-critical categorization information of the detected object.

According to some embodiments, previously to the transmitting step, the method may further comprise:

- determining the safety-critical categorization information of the detected object, wherein the safety-critical categorization information comprises a safety-critical level;
- determining whether the safety-critical level of the detected object is higher than a corresponding safety-critical level threshold;
- if the safety-critical level of the detected object is higher than the corresponding safety-critical level threshold, decreasing a minimum time elapsing between two consecutive CPM generation events.

According to some embodiments, previously to the transmitting step, the method may further comprise:

- determining an event constituting a safety risk for the monitored area;
- wherein in response to the detection of the event, triggering the transmitting step.

According to some embodiments, wherein the safety-critical categorization information comprises a safety-critical level, the method may further comprise:

- disabling any mechanism preventing a detected object associated with a safety-critical level higher than a corresponding safety-critical level threshold to be reported in the CPM.

According to some embodiments, the CPM may comprise a data element, Perceived Object Container, configured to contain information related to either the individually reported object or the group of detected objects comprising the reported object.

According to some embodiments, the Perceived Object Container may comprise a data field dedicated to indicate safety-critical categorization information of either the individually reported object or the group of detected objects comprising the reported object.

According to a second aspect of the invention there is provided a method for transmitting a Collective Perception Message, CPM, the method being intended for an Intelligent Transport System, ITS, comprising at least one originating ITS station, ITS-S, the method comprising the following steps, at the at least one originating ITS-S:

- transmitting a CPM reporting information related to at least one object detected within an area monitored by the originating ITS-S, and reported with at least one another detected object thereby forming a group of detected objects;
- wherein all the objects reported within a group of detected objects are categorized as not critical for the safety.

The benefit of using such group reporting, is that the transmitted CPM is more compact, as it factors out features common to the detected objects of the group. Such transmitted CPM is then shorter as it includes description information common to all the detected objects of the group, at the group level. Further, the processing at the receiving stations is advantageous as such grouping reduce the number of objects to compare and/or process.

Further, it is also provided a method for processing a Collective Perception Message, CPM, the method being intended for an Intelligent Transport System, ITS, comprising at least one originating ITS station, ITS-S, and at least one receiving ITS-S, the method comprising the following steps, at the at least one receiving ITS-S:

- receiving a CPM reporting information related to at least one object detected within an area monitored by the originating ITS-S, wherein the at least one object is reported with at least one another detected object thereby forming a group of detected objects;
- categorizing as not critical for the safety of the monitored area all detected objects that belong to the group.

Optional features of embodiments of the second aspect are defined in the appended claims. Features formulated in the appended claims with reference to a method can be transposed into system features dedicated to any device according to embodiments of the invention.

According to some embodiments, the safety-critical categorization information may be a one-bit flag set to 1 when the object is categorized as critical for the safety of the monitored area and set to 0 otherwise According to some embodiments, previously to the transmitting step, the method may further comprise:

selecting among the objects detected by the originating ITS-S, the objects to be reported within the CPM to be transmitted;

wherein the CPM reports information related to each selected object.

According to some embodiments, the selecting step may comprise, for each detected object:

obtaining a current safety-critical categorization information of the detected object;

retrieving a former safety-critical categorization information of the detected object, previously sent in a previous CPM;

selecting the detected object when the current safety-critical categorization information is different from the former safety-critical categorization information.

According to some embodiments, the former safety-critical categorization information and the current safety-critical categorization information may be the same, and the method may further comprise:

retrieving a former value of at least one reported parameter of the detected object, previously sent in a previous CPM;

obtaining a current value of the reported parameter of the detected object;

selecting the detected object when the difference between the current value and the former value of the reported parameter is greater than a predefined threshold.

According to some embodiments, the reported parameter may be one among a position, a speed or an acceleration relatively to the originating station.

According to some embodiments, the selected object may be one among a Vulnerable Road User, VRU, or a vehicle.

According to some embodiments, the CPM may comprise a data element, Perceived Object Container, configured to contain information related to either the individually reported object or the group of detected objects comprising the reported object.

According to some embodiments, the Perceived Object Container may comprise a data field dedicated to indicate safety-critical categorization information of either the individually reported object or the group of detected objects comprising the reported object.

According to a third aspect, it is provided a method for processing a Collective Perception Message, CPM, the method being intended for an Intelligent Transport System, ITS, comprising at least one originating ITS station, ITS-S, and at least one receiving ITS-S, the method comprising the following steps, at the at least one receiving ITS-S:

receiving a CPM reporting information related to at least one object detected within an area monitored by the originating ITS-S, wherein the at least one object is reported with at least one another detected object thereby forming a group of detected objects;

retrieving from the reported information a safety-critical categorization information common to all the objects of the group of detected objects, indicating whether the group of detected objects is categorized as critical for the safety of the monitored area.

Optional features of the third aspect of the invention are defined in the appended claims. Features formulated in the appended claims with reference to a method can be transposed into system features dedicated to any device according to embodiments of the invention.

According to a fourth aspect, it is provided a method for transmitting a Collective Perception Message, CPM, the method being intended for an Intelligent Transport System, ITS, comprising at least one originating ITS station, ITS-S, the method comprising the following steps, at the at least one originating ITS-S:

transmitting a CPM reporting information related to at least one object detected within an area monitored by the originating ITS-S, and reported with at least one another detected object thereby forming a group of detected objects, according to predefined grouping rules;

wherein the at least one object and the at least one another detected object are VRUs having different profiles according to ETSI 103 300-3.

Optional features of embodiments of the fourth aspect are defined in the appended claims. Features formulated in the appended claims with reference to a method can be transposed into system features dedicated to any device according to embodiments of the invention.

According to a fifth aspect of the invention, it is provided a Collective Perception Message, CPM, to be sent by an originating station of an Intelligent Transport System, ITS, comprising at least one Perceived Object Container including information related to a reported object, wherein the Perceived Object Container further comprises a data element dedicated to report safety-critical categorization information of the reported object, indicating whether the reported object is categorized as critical for the safety of an area monitored by the originating station.

Optional features of embodiments of the fifth aspect are defined in the appended claims.

In some embodiments, the CPM may comprise a certificate of the originating ITS-S granted by a certification authority, including a permission to provide a safety-critical categorization information.

According to some embodiments, it is provided a method for transmitting a Collective Perception Message, CPM, the method being intended for an Intelligent Transport System, ITS, comprising at least one originating ITS station, ITS-S, the method comprising the following steps, at the at least one originating ITS-S:

determining a safety-critical categorization information of at least one detected object within an area monitored by the originating ITS-S indicating whether the detected object is critical for the safety of the monitored area, wherein the safety-critical categorization information comprises a safety-critical level;

determining the safety-critical categorization information of the detected object, wherein the safety-critical categorization information comprises a safety-critical level;

determining whether the safety-critical level of the detected object is higher than a corresponding safety-critical level threshold;

if the safety-critical level of the detected object is higher than the corresponding safety-critical level threshold, decreasing a minimum time elapsing between two consecutive CPM generation events;

selecting a time greater than the minimum time value and setting a timer to the selected time;

when the timer elapsed, transmitting a CPM reporting information related to the detected object within an area monitored by the originating ITS-S, wherein the reported information comprises the safety-critical categorization information of the detected object.

According to some embodiments, it is provided a method for transmitting a Collective Perception Message, CPM, the method being intended for an Intelligent Transport System, ITS, comprising at least one originating ITS station, ITS-S, the method comprising the following steps, at the at least one originating ITS-S:

detecting, using data of sensors of the originating ITS-S, an event constituting a safety risk for the monitored area;

in response to the detection of an event constituting a safety risk for the monitored area is determined, transmitting a CPM reporting information related to detected within an area monitored by the originating ITS-S, wherein the reported information comprises the safety-critical categorization information of the detected object.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible, non-transitory carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. Embodiments of the invention will now be described, by way of example only, and with reference to the following drawings, in which:

FIG. 2 illustrates an example of a list of predetermined safety rules according to the present invention;

DETAILED DESCRIPTION OF THE INVENTION

The names of the lists and elements (such as data elements) provided in the following description are only illustrative. Embodiments are not limited thereto and other names could be used.

Figure 1:
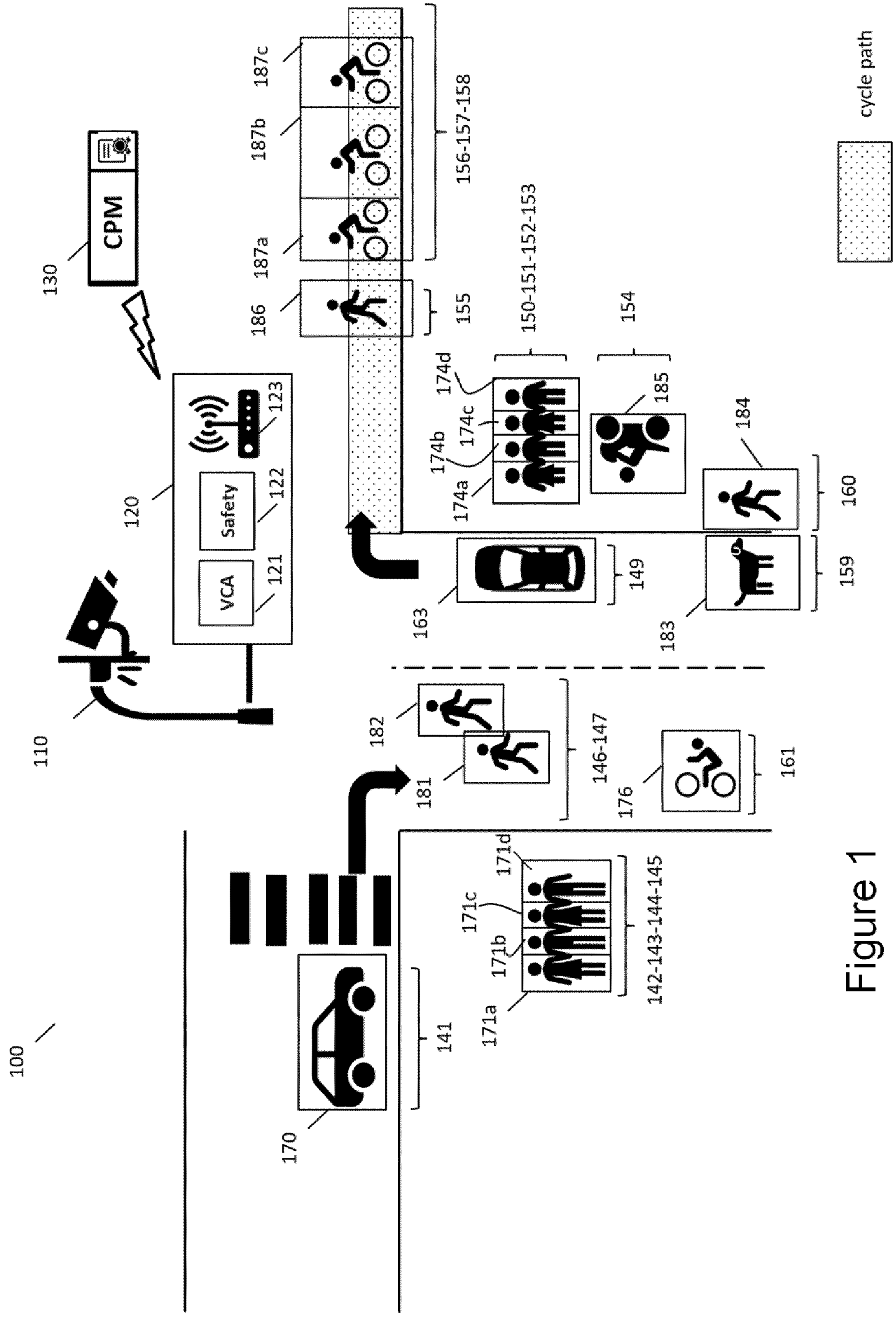
FIG. 1 illustrates a typical Intelligent Transportation Systems (ITS) in which the invention may be implemented.

The embodiments of the present invention are intended to be implemented in an Intelligent Transportation Systems (ITS). An example of such a system 100 is illustrated in FIG. 1.

In this example, the ITS 100 is implemented at an intersection, and comprises a fixed road side entity 120, and several entities, such that all these entities may carry or comprise ITS station (ITS-S) each, for transmitting and or receiving ITS messages within the ITS. The several entities may be for example, the vehicles 141 and 149, a motorcycle 154, four moving bicycles 156, 157, 158 and 161 and pedestrians 142, 143, 144, 145, 146, 147, 150, 151, 152, 153, 155, 160 and an animal 159.

The fixed road side entity 120 includes a set of sensors, such as image sensors here a video camera 110, an analytical module to analyze data provided by the sensors, such as a Video Content Analytics (VCA) module 121. The video camera 110 is configured to scan a monitored area, i.e. the intersection, and thus reproduced images of the monitored area.

Different types of sensors may be embedded in the ITS-S, and can be used by the ITS station to analyze the surrounding situation. For example, sensors may be cameras, infrared cameras, Lidar, Radar. An ITS radio element allowing to receive ITS messages is also considered as a sensor as it allows receiving any type of messages, such as Cooperative Awareness Message (CAM), VRU Awareness Message (VAM) or Decentralized Environmental Notification Message (DENM) messages indicating positions of objects (CAM indicating vehicles position, and VAM indicating VRUs position) or warnings related to object positions (in DENM).

The sensors and the analytical module, i.e. the video camera 110 and VCA module 121, are connected so that the VCA module 121 processes the stream captured by the sensors/video camera 110. According to some embodiment, the analytical module and the sensors may be separate from or embedded within the road side entity 120. For example, the analytical module may be wire-connected to the video camera 110 that may be remote (i.e. not embedded in the road side entity 120).

The processing by the analytical module, e.g. VCA module 121, aims at detecting objects potentially present in the monitored area, referred to as "perceived objects" or "detected objects" hereinafter. A confidence level is associated with each object detected by the VCA module. If multiple sensors are available by the ITS station, the analytical module may also fusion the different detections so that a same object detected by several sensors is identified once.

The analytical module, e.g. VCA module 121, is also configured to output a list of the detected objects with sufficiently high confidence level respectively associated with corresponding description information referred to as state vector. The state vector may include for instance parameters as position, kinematic, temporal, behavioural or classification information, etc.

Therefore, the analytical module may identify, among the detected objects, the Vulnerable Road Users, VRU, such as pedestrians, cyclists as well as motorcyclists and also persons with disabilities or reduced mobility and orientation. Such VRUs may carry an ITS equipment, that may be for instance included in a smartphone, a GPS, a smart watch or in a cyclist equipment, etc.

For example, in the illustrated example, by scanning the area, the VCA module 121 has captured the following detected objects:

- objects 170 and 163 respectively corresponding to the vehicles 141 and 149 on the roadway;
- objects 181, 182, 184, and 186 respectively corresponding to pedestrians 146, 147, 155 and 160 on the sidewalk and on the cycle path;
- objects 183 corresponding to a dog on the sidewalk being walked by the pedestrian 160 (i.e. detected object 184);
- object 185 and 176 respectively corresponding to a motorcycle 154 and a bicycle 161 respectively on the sidewalk and the roadway;
- the objects 171*a*, 171*b*, 171*b*, 174*a*, 174*b*, 174*c*, 174*d* corresponds respectively to the pedestrians 142, 143, 144, 145 and 150, 151, 152, 153; and
- the objects 187*a*, 187*b* and 187*c* correspond respectively to the cyclists moving on the bicycles 156, 157, 158.

According to some embodiments, each entity is detected individually.

Further, the detected objects may be classified, for example, according to whether the ITS station is a vehicle, a VRU, or a RSU, or of another type. Such classification may be based for example on predetermined rules, provided during the setting up of the road side entity 120, or more generally the ITS-S.

According to some embodiments, the detected VRUs may be classified according to their "vulnerability", that is to say, in line with the VRU profiles specified in ETSI 103 300-3 relative to VRU awareness basic service. In this specification, VRU Profile 1 corresponds to pedestrian, VRU Profile 2 corresponds to bicyclist, VRU Profile 3 corresponds to motorcyclist and VRU Profile 4 corresponding to animals. Thus, in the illustrated example, the motorcycle 154 is classified as a VRU Profile 3, bicycles 156, 157, 158 and 161 classified as VRU Profile 2, 142, 143, 144, 145, 146, 147, 150, 151, 152, 153, 155, 160 as VRU Profile 1.

The present invention proposes to implement an additional module, referred to as a safety-critical categorization module 122 within an ITS-S, which may be embedded an ITS, which may be associated with any entity of the ITS, such as a road side entity 120, or a vehicle, or on VRUs such as a motorcyclist. In the present example, such safety critical categorization module 122 is embedded within the road side entity 120. Such a safety-critical categorization module 122 aims at analysing each detected object and may determine a safety criticality for each one.

The safety-critical categorization module 122 may be either separate from or embedded inside the associated entity, e.g. in the road side entity 120. Such safety-critical module categorization 122 is connected (by wire or wirelessly) to both the analytical module, VCA 121, and a communication module, which enable the road side entity 120 to share information within the ITS system.

By definition, a safety-critical object is a detected object whose presence in the monitored area poses a safety risk to other objects in that area. Such safety-critical categorization information aims at warning about a risky situation within the monitored area. For example, as visible on FIG. 1, pedestrians 146, 147 and dog 159 are considered safety-critical objects, as their presence on the road poses a risk to car 170 and bicycle 161 (according to predetermined safety-critical categorization rules, for example risk of collision). And so do bicycles 156-157-158 with respect to pedestrian 155, as well as car 149 to them both.

The safety-critical categorization of the detected objects by the safety-critical categorization module 122 may be based on predetermined safety-critical categorization rules relative to the monitored area. These safety-critical categorization rules are applied to the detected objects, using associated description information of the detected objects provided by the VCA module 121. This allows to identify potential risks or abnormal situations, and consequently determining a safety-critical categorization for each detected object.

The safety-critical categorization of the detected objects may evolve, such that, safety-critical categorization information relative to the detected objects in the monitored area may be assessed several times, for example periodically. A data history of the safety-critical categorization information relative to the detected objects in the monitored area may be registered.

According to some embodiments, such predetermined safety-critical categorization rules may be specified during initialization of the safety-critical categorization module 122, for example at installation of the road side entity 120.

For example, a safety-critical categorization rule may correspond to a list of criteria that an object should fulfil, in all or in part, to be categorized as either safety-critical or non-safety-critical. For instance, such criteria may include (list not limitative): a sub-area of the monitored area corresponding to the area where the safety-critical categorization rule is applied; a class of sub-area corresponding to sub-areas wherein the safety-critical categorization rule is applied (classes of sub-area may be for example cycle path, sidewalk, pedestrian crossing, roadside, etc.); and description information values of detected object (such as position, kinematic, classification) for which the safety-critical categorization rule is specified.

An example of a list of predetermined safety-critical categorization rules, specified for the monitored area of FIG. 1, is illustrated on FIG. 2. Of course, the list of predetermined safety-critical categorization rules may be adapted according to the distinctiveness of the monitored area, and the local legislation regarding road user traffic.

In this example, the predetermined safety-critical categorization rules are to be applied to the VRUs in the monitored area. Nevertheless, in some embodiments, the predetermined safety-critical categorization rules may be specified to any vehicle and VRU, and more generally to any class of entity that may move in the observed area. For example, the predetermined safety-critical categorization rules used by the safety-critical categorization module 122 may concern specific objects, such as VRUs.

Therefore, by applying the illustrated list of predetermined safety-critical categorization rules described in FIG. 2 on ITS 100, the following detected objects are categorized as safety-critical: VRU people 146 and 147 crossing a road outside pedestrian crossing, VRU animal 159 present on the roadside, motorcycle 154 riding on the sidewalk with a speed greater than 5 km/h, pedestrian 155 on the cycle path, bicycle 161 riding in the wrong direction.

The road side entity 120 further comprises a Road Side Unit (RSU) 123, including a Roadside ITS-S as specified in the reference architecture of an ITS station defined in the version V1.1.1 of the ETSI EN 302 665 specification. By the means of the RSU 123, the road side entity 120 may share information relative to the detected objects, and according to the invention, relative to the safety-critical categorization of each detected objects, to the other ITS-S of the ITS system.

Such sharing is performed using ITS messages, particularly the so-called Collective Perception Message 130 defined in document ETSI TR 103 562 and ETSI TS 103 324. CPMs are used by the road side entity 120 to share its perceived environment, i.e. detected objects, with receiving ITS stations. In the description, the expression "originating ITS-S" and "receiving ITS-S" are used to respectively designate the ITS-S sending an ITS message, and the ITS-S receiving an ITS message. According to some embodiments, such CPMs are periodically sent by the originating ITS-S.

Figure 3:
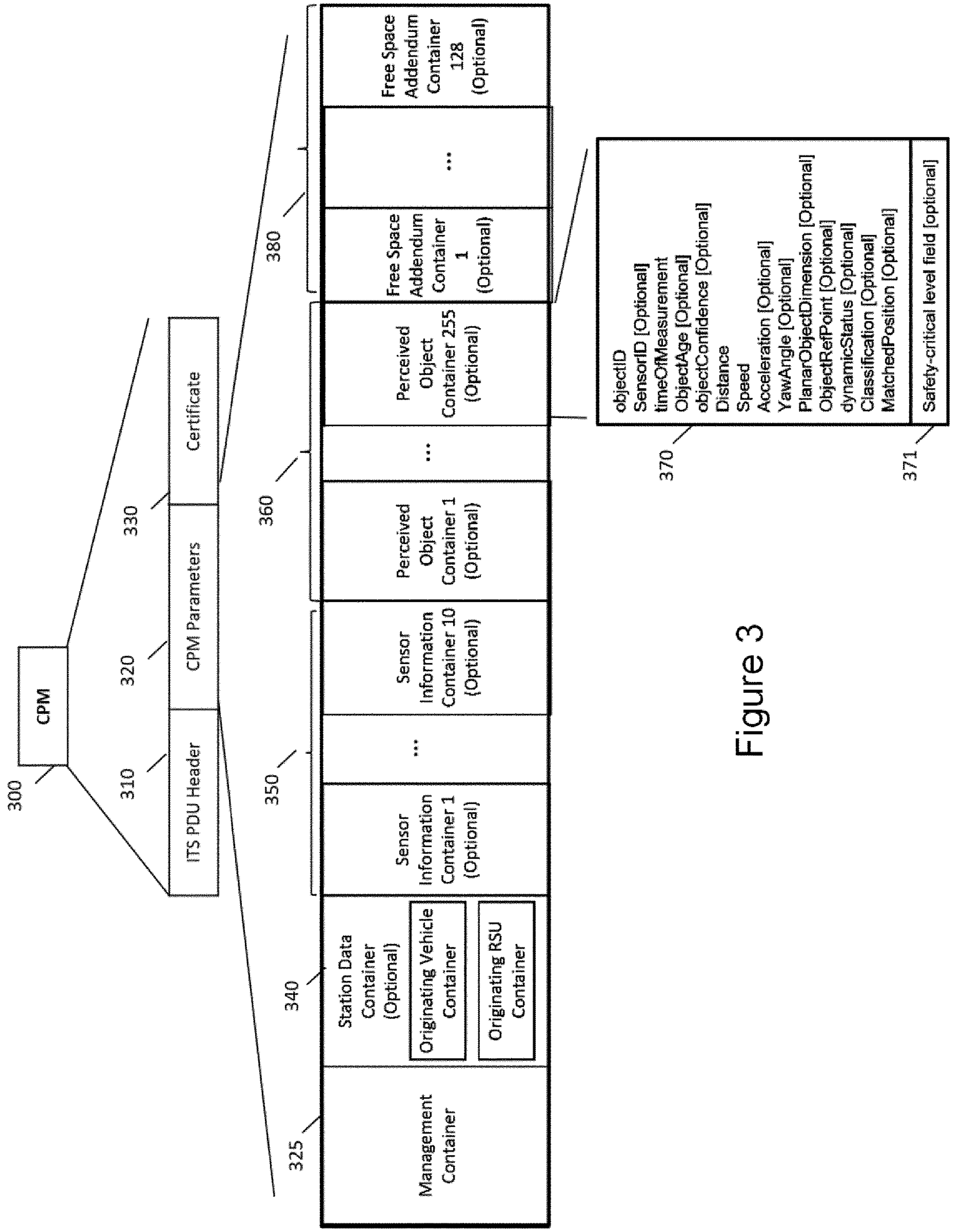
FIG. 3 illustrates an example of a structure of a Collective Perception Message according to the present invention.

An example of a format of a CPM according to the invention is illustrated in FIG. 3, which is based on the CPM format as specified in the version 0.0.20 of the ETSI TS 103 324 specification.

CPM 300 reports description information related to each object detected by VCA module 121 with a sufficiently high confidence level.

To do that, the CPM 300 contains an ITS PDU header 310, a "CPM Parameters" field 320 and a Certificate 330.

The ITS PDU header 310 includes information related to the used protocol, and an information related to the type of the message, i.e. a CPM message type.

The "CPM Parameters" field 320 may contain a Management Container 325, a Station Data Container 340, one or more optional Sensor Information containers (SIC) 350, one or more optional Perceived Object Containers (POC) 360 and one or more optional Free Space Container (FSC) 480.

The Management Container 325 contains information regarding the type of station from which the CPM is originated. It may exist at least two types of ITS-S: the one embedded in/or carried by the entities presented with reference to FIG. 1, and the one embedded in the fixed road side entities. For example, it may be indicated within this field that the CPM is originated from a the ITS-S embedded in the RSU 123. Besides, the Management Container 325 contains information related to a reference point of the originating ITS Station corresponding to a Reference Position of the originating ITS Station as defined in the ETSI 102 894 standard.

The Station Data Container 340 is an optional field whose content varies whether the originating ITS Station is fixed or mobile. In a CPM generated by a mobile ITS-S, e.g., vehicles 120, 130, Station Data Container 340 is mandatory and contains dynamic information (e.g., speed, heading and optionally other information such as longitudinal and/or lateral and/or vertical acceleration, yaw rate, pitch/roll angles, . . . ) of the originating IT-S. In a CPM generated by a fixed ITS station, e.g., RSU 123, Station Data Container 340 is optional and provides references to identification numbers provided by a MAP (road topology) Message as defined in CEN ISO/TS 19091:2017, sent by the RSU 123.

Each Sensor Information container 350 comprises information related to the sensor capabilities of a given sensor of the originating ITS-S. For example, Sensor Information container 350 may comprise the type of sensor (e.g. camera, infrared camera, radar, radio, etc.), the covered area (e.g. a polygon on a map representing the area observable through the given sensor). Different container specifications may be used to encode the sensor properties, depending on the station type of the originating ITS station. The Sensor Information container may be included within a CPM at a lower frequency than the other containers, as defined in above-mentioned ETSI TR 103 562 specification.

The Perceived Object Containers 360 are provided for each detected object, corresponding to each entity detected individually, through the embedded sensors of the originating ITS-S. Referring to FIG. 1, objects detected by the road side entity 120 has been illustrated. In order to share information related to these objects, the RSU 123 of the road side entity 120 may share CPM comprising one or more Perceived Object Container 360, each being related to a detected object.

A Perceived Object Container 360 is made of a sequence of optional or mandatory data elements (DEs) comprising one or more data fields (DFs), which give a detailed description of the dynamic state and properties of the detected (i.e., perceived) object.

As shown on FIG. 3, through fields 370, the perceived object description information may comprise:

- an identifier of the detected object referred to as DE objectID,
- a time of measurement referred to as DE timeOfMeasurement and corresponding to the time difference elapsed between the measurement time of the provided information and the generation time of Management Container 430 and stated in it,
- an object confidence referred to as DE objectConfidence corresponding to the confidence associated with the object,
- a reference point (DE objectRefPoint) corresponding to a reference point of the detected object. By default, the reference point is the centre point of the detected object,
- a distance determined according to a frame of reference fixed to the originated ITS-S. For example, the distance is determined relatively to three directions x, y, z of the frame of reference, such that the distance is indicated within three DFs xDistance, yDistance, zDistance, which represent together the distance between the perceived object and the originating ITS station's reference point at the time of measurement,
- a speed with respect to originating ITS station's reference point at the time of measurement. For example, the speed is determined relatively to three directions x, y, z of the frame of reference such that the speed is indicated within three DFs xSpeed, ySpeed, zSpeed, representing together the speed of the detected object,
- an acceleration with respect to originating ITS station's reference point at the time of measurement. For example, similarly to the speed, the acceleration is indicated within three DFs xAcceleration, yAcceleration, zAcceleration relatively to the three directions of the frame of reference fixed to the originating ITS-S,
- a dynamic Status (DE dynamicStatus) providing the capabilities of the originating ITS-S to move away from the perceived object,
- a dimension indicating the dimensions of the perceived object. The dimension may be indicated within three DFs (planarObjectDimension1, planarObjectDimension2, verticalObjectDimension), and
- a classification within a DE Classification, providing the classification of the perceived object.

According to some embodiments, the DE Classification may be used in order to indicate whether the detected object is a vehicle or a VRU. Particularly, when the detected object is a VRU, it may be specified the VRU profiles, as detailed hereinbefore, within the DE classification.

According to the invention, the CPM 300, particularly the Perceived Object Container 360 may further comprise a new optional DF 371 referred to as "safety-critical level", in order to report, for each detected object, its safety-critical categorization level, according the predetermined safety-critical categorization rules listed in FIG. 2.

This new DF 371 related to a safety-critical categorization level may provide, for each individually detected object, an indication indicating whether the detected object is a safety-critical object, or not, as defined earlier.

According to some embodiments, the DF 371 may be a flag, e.g. a one-bit flag, such that the bit value is set to 1 for a detected object categorized as safety-critical, and set to 0 if categorized as non-safety-critical, as illustrated in FIG. 2.

| Descriptive Name | objectSafetyCriticalLevel |
|---|---|
| ASN.1 representation | SafetyCriticalLevel ::= INTEGER {<br>notSafetyCritical (0), -- the safety critical level is set to 0, no safety-risk detected<br>SafetyCritical (1), -- the detected object is having a safety risk<br>} (0..1) |
| Definition | Describes the safety-critical level value of a detected object. This DE is optional. |
| Unit | Not applicable |

According to some embodiments, the safety-critical level is an integer value, where 0-value means that the object is not detected as safety-critical, i.e. no safety-risk is detected, and higher values means that the object is detected as safety-critical with different level of risk.

For example, a car, which may cause a low-speed crash with another car, is associated with a low safety-critical level, as the risk of injuries of the road users is low. Conversely, a car, which may cause injuries to a VRU, is associated with a higher safety-critical level as the risk of injuries are high. Thus, the value of safety-critical level may depend on the criticality of the risk that the object constitutes for the monitored area, e.g. whether the object may cause injuries to the road users, and particularly to the VRUs.

| Descriptive Name | objectSafetyCriticalLevel |
|---|---|
| ASN.1 representation | SafetyCriticalLevel ::= INTEGER {<br>notSafetyCritical (0), -- the safety critical level is set to 0, no safety-risk detected<br>lowSafetyCritical (1), -- the detected object is having a low level of safety risk<br>mediumSafetyCritical (2), -- the detected object is having a medium level of safety risk<br>highSafetyCritical (3), -- the detected object is having a high level of safety risk<br>} (0..15) |
| Definition | Describes the safety-critical level value of a detected object. This DE is optional. |
| Unit | Not applicable |

In a variant, the safety-critical level can be a percentage value.

| Descriptive Name | objectSafetyCriticalLevel |
|---|---|
| ASN.1 representation | SafetyCriticalLevel ::= INTEGER {<br>notSafetyCritical (0), -- the safety critical level is set to 0, no safety-risk detected<br>onePercent (1),<br>oneHundredPercent (100),<br>unavailable (101) -- In case the level value computation is not available<br>} (0..101) |
| Definition | Describes the safety-critical level value of a detected object. This DE is optional. |
| Unit | percent |

In order to determine the safety-critical status of an object, the objectSafetyCriticalLevel can be compared to a threshold SafetyCriticalLevel_Threshold. Objects with a level higher than the threshold shall be considered as safety-critical objects.

The threshold may be a predetermined value which may be defined in advance in a standard or a profile.

As an alternative, the threshold may depend of the type of the ITS station: a VRU ITS station may have a lower threshold than a vehicle ITS.

The threshold may also change according to surrounding conditions. For example, in case of high number of detected vehicles or if there are a high number of objects with high value for the SafetyCriticalLevel, the threshold may be increased in order to limit the number of reported objects.

According to some embodiments, the safety-critical categorization is comprised in the CPM, for example in data element other than the Perceived Object Container.

The CPM 300 further comprises a Certificate 330, comprising an indication related to the different permissions granted to the originating ITS-S by a certification authority.

In the described ITS, in order to secure V2X communications within ITS 100, a Public-Key-Infrastructure (PKI) as defined in the version 1.1.1 of the ETSI TS 102 731 specification may be used that provides security and verification required to trust the originating ITS-S. The PKI-based security may be implemented through the use of certificates delivered by a certification authority to the ITS stations.

Therefore, each ITS message exchanged is made of a non-encrypted message, CPM parameter 320, accompanied with a digital signature and a pseudonym certificate (also referred to as authorization ticket) that validates the authenticity of the originating ITS-S and the integrity of the message, while keeping anonymity of the originating ITS-S. For communicating within the ITS, an ITS-S may comprise one or more authorization tickets, and may use an authorization ticket for communicating.

Information about the safety-critical categorization of the different entities present in the monitored zone, provided in the DF 371 of the CPM 300, should preferably, for security reasons, come from a station considered as secure.

The authorization ticket may therefore comprise indications related to the privileges and authorizations of an originating ITS-S to transmit specific ITS messages, notably CPM 300 comprising a DF 371.

To do this, for example, an authorization ticket may contain a field called ITS AID, which includes the list of the services that the station is authorized to access and use as specified in ETSI TR 102 965. In particular, a specific one is dedicated to Cooperative Awareness Service that indicates that the sender is entitled to send CPMs. The authorization ticket contains also a field called ITS AID Service Specific Permissions (SSP), which indicates specific sets of permissions within the overall permissions indicated by the ITS-AID. Its format is specified in ETSI TS 103 097.

Figure 4:
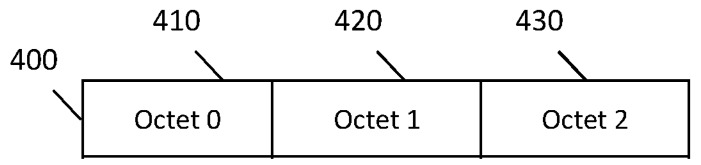
FIG. 4 illustrates an example of a Service Specific Permission (SSP) item which may be specified in the certificate of a CPM according to the present invention.

According to some embodiments, a SSP is provided, that may be specified in the certificate of a CPMs containing a DF 371 as described hereinbefore. An example of SSP 400 is illustrated in FIG. 4.

A SSP 400 may comprise 3 octets, 410, 420 and 430. The first one 410 identifies the SSP version and the second 420 and third 430 specify specific permission. A specific permission 450 is introduced using the first bit of the second octet 420, set to 1 for indicating a permission for reporting a safety-critical categorization information in the payload of the CPM (0 otherwise). Of course, another position may be contemplated.

According to some embodiments, such a SSP may be provided in authorization tickets dedicated for a RSU, which are less likely to be hacked. Of course, according to some embodiments, such a SSP may be provided within authorization tickets to any type of ITS-S.

Figure 5:
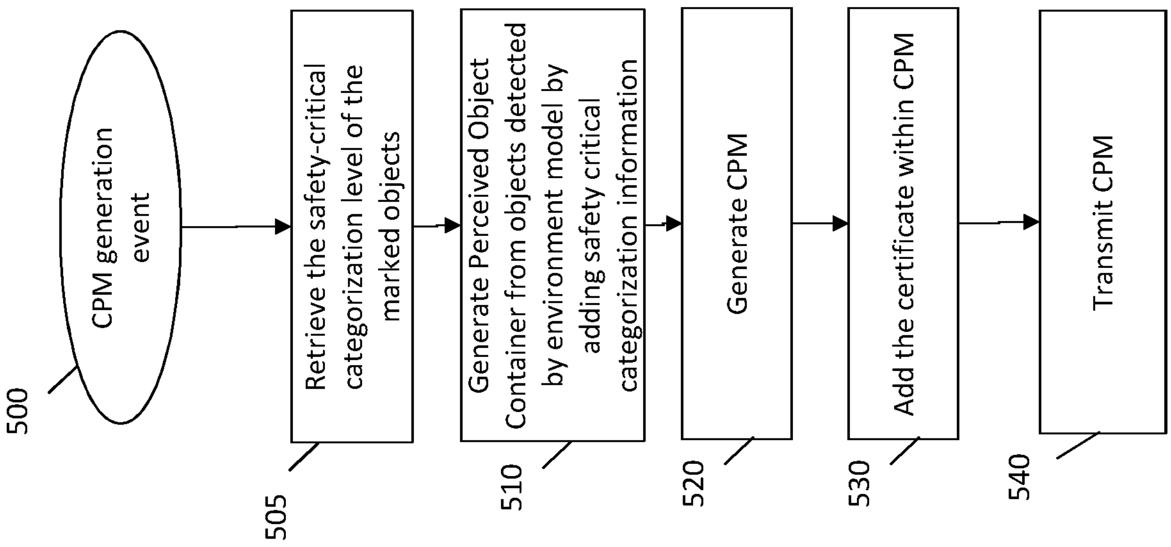
FIG. 5 schematically illustrates, using a flowchart, steps of a communication method for transmitting a CPM including a safety-critical categorization information according to a first embodiment of the present invention.

In order to better understand the invention, a communication method according to the invention and implemented at an originating ITS-S station, that may be either a vehicle or a VRU or a RSU, is described in reference with FIG. 5.

The illustrated communication method is for transmitting a CPM including information related to safety-critical categorization according to the present invention. Such method may be implemented at the Collective Perception Service module of an ITS station, such as RSU 123, which has received the permission by a specific certification authority to report information related to safety-critical categorization within its transmitted CPM.

This method is launched at a CPM generation event, at step 500, as defined in standard ETSI TS 103 324 (section 6.1.3.1 CP Message generation frequency management).

At step 500, at a CPM generation event, the Collective Perception Service module marks a list of detected objects to be transmitted within the next CPM to be transmitted, as it is defined in the standard ETSI TS 103 324 (section 6.1.3.2 Perceived Object Container Inclusion Management). Such objects are referred to as marked objects hereinafter. According to some embodiments, more generally, the objects to be reported may be selected.

Next, at step 505, for each marked object, the current safety-critical categorization, determined by the safety-critical categorization module 122, is retrieved.

Next, at step 510, Perceived Object Containers 370 of the marked objects are generated in view of their transmitting within a CPM. In particular, for each one, the DF 371 is set to its corresponding safety-critical categorization as retrieved at step 505.

Then, at step 520, a CPM is generated by generating a corresponding ITS PDU header 310 and the other containers included in CPM parameters 320 as described hereinbefore in relation to FIG. 3.

At step 530, the certificate 330 given by a specific certification authority including the permission, as described with reference to FIG. 5, to include safety-critical categorization information in a CPM, is generated and included within the CPM.

Then, at step 540, the CPM including safety-critical categorization information is transmitted to one or more receiving ITS-S.

According to some embodiments, safety-critical categorization information providing using a CPMs may be registered. For example, a data history relative to safety-critical categorization information may be registered.

Optionally, before the generation of the object containers of the marked objects at step 510, it may be contemplated to apply redundancy mitigation technics.

For example, objects which have already been reported recently by other ITS stations can be removed from the list of the marked objects to be reported in the next CPM to be transmitted.

However, an object associated with a safety-critical level higher than the threshold SafetyCriticalLevel_Threshold should not be subject to redundancy mitigation techniques. In other words, regardless of whether it has already been reported by the same or by other ITS-S, an object should be included in the next CPM to be transmitted if its safety-critical level is higher than SafetyCriticalLevel_Threshold. Therefore, for such safety-critical objects, redundancy mitigation technics are disabled.

Such redundancy mitigation technics may enable to reduce the number of marked perceived objects to be reported in the next CPM to be transmitted. It may be useful to limit risk of bandwidth congestion by decreasing the size and number of CPMs to be transmitted.

Therefore, such a method enables an ITS-S to provide safety-critical categorization information for certain detected objects, preferably for all the detected VRUs, to the other ITS-S of the ITS. In a preferred embodiment, only ITS-S having a certificate providing a permission to the ITS-S to deliver safety-critical categorization information may be allowed to send CPM including safety-critical categorization information. Thus, thank to this safety-critical categorization information, receiving stations may quickly determine whether the safety of the monitored area is at risk (i.e., as said earlier, if an object, in the monitored area, constitutes a safety risk), and, furthermore, which object detected by fixed road side entity 120 is the source of this safety issue. Further, thanks to the safety-critical level, it will be possible to prioritize the perceived object candidates to be included at next CPM during the next CPM Generation event.

A second aspect of the invention is now described in relation to FIGS. 6 to 16.

In this second aspect of the invention, the reporting of the detected objects may be performed by grouping objects according to one or more conditions. The grouping may involve at least two detected objects. Such group reporting may be performed with or without using the safety-critical categorization information described in the first aspect of the invention.

The benefit of using such group reporting, is that the transmitted CPM is more compact, as it factors out features common to the detected objects of the group. Therefore, the obtained CPM does no longer include description information duplicated several times in separate containers associated with detected objects. The CPM is shorter as it includes description information common to all the detected objects of the group, at the group level.

The station thus processes the group of detected objects as an entity within the ITS system. Such processing is especially advantageous as it reduces the number of objects to compare and/or process.

First, the grouping concept of detected objects is described in reference with FIGS. 6 to 9, and then, the grouping concept taking into consideration safety-critical categorization of detected objects is described with respect to FIGS. 10 to 16.

Figure 6:
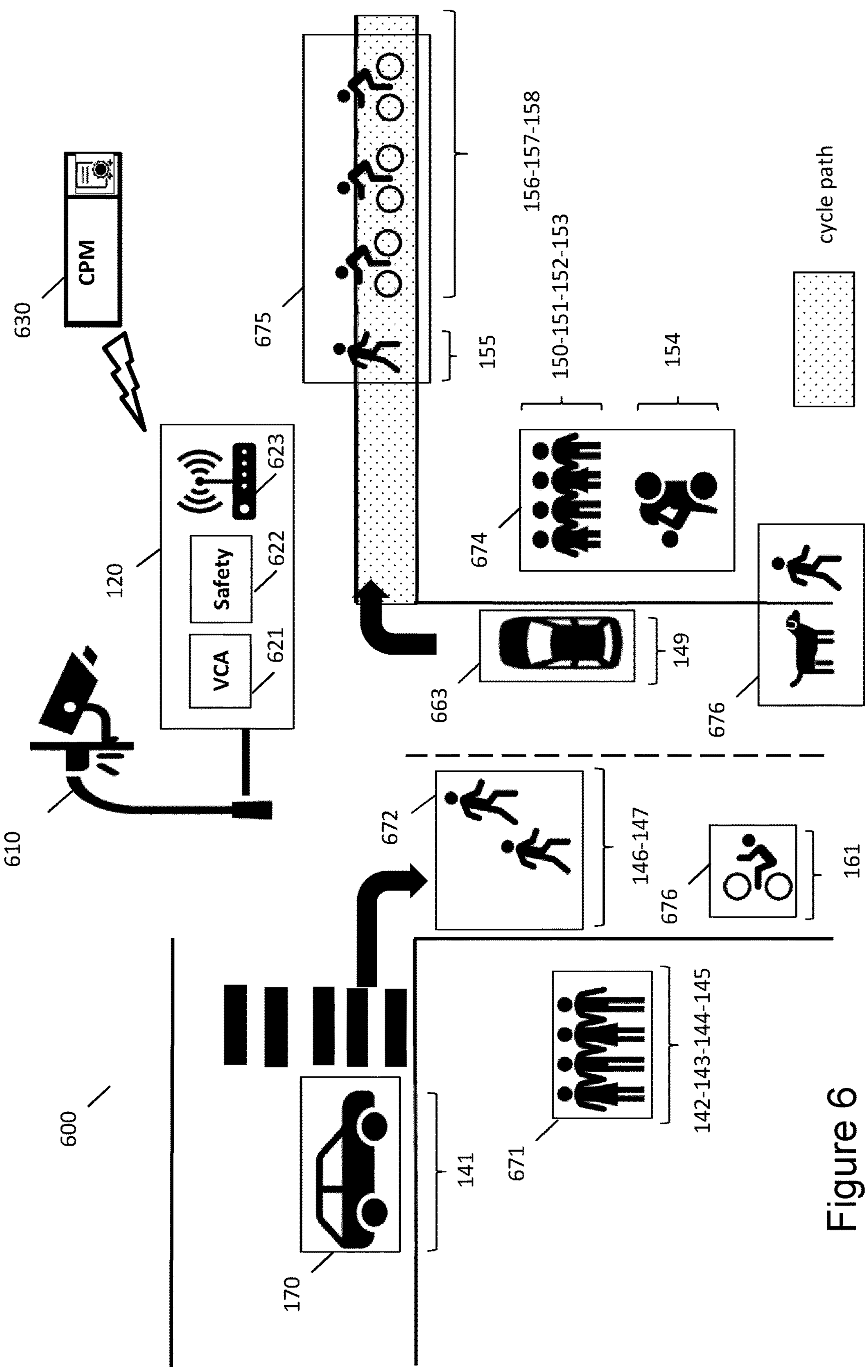
FIG. 6 illustrates the same exemplary ITS of FIG. 1 in which objects reporting within groups according to the second aspect of the invention is implemented, where detected VRUs are grouped into groups.

As visible on FIG. 6, the intersection of FIG. 1 is represented with the detected objects and group of objects are represented.

Such grouping is performed after the detection of objects by the VCA module 121, by an algorithm implemented at the road side entity 120.

Thus, detected objects are grouped into the groups of objects 671, 672, 674, 675 and 676 by the algorithm, detailed hereinafter. As visible on FIG. 6, the groups of objects 671, 672, 674, 675 respectively corresponds to a group of pedestrians 142-145, two pedestrians 146-147 crossing the street outside the pedestrian crossing, a group of pedestrians 150-153 together with the motorcycle 154 on the sidewalk, a group of cyclist 156-158 together with a pedestrian both on the cycle path, and a pedestrian 160 with its dog 159 each one being respectively on the sidewalk and the road itself.

Such grouping enables to group within a given perceived object container information common to all the object forming a group of detected objects.

According to some embodiments, the grouping is performed for VRUs of equivalent "vulnerability".

The grouping may be based on conditions, such as the conditions of clustering joining operation as defined in ETSI TS 103 300, detailed hereinafter with respect to FIG. 7.

Thanks to adaptations of the DE classification within the CPM 300, such groups of detected objects may also be reported using CPM 300 as described in reference to FIG. 3. The adaptations may be in line with the standard ETSI TS 103 300-3 relative to the VRU awareness basic service. In particular, adaptations may be done in order to report in the DE classification the VRU profiles specified in ETSI TS 103 300-3 and to report a VRU either individually or as a group.

For example, the current version of standard ETSI TR 103 562 has enhanced the DE classification with additional classes. More precisely, a new class specified by the field vruSubclass corresponds to an object classified as a single VRU, corresponding to the class VruProfileAndSubprofile specified in ETSI TS 103 300-3.

A second class specified by the field groupSubclass corresponds to a group of VRUs, corresponding to the class ObjectGroupSubClassType. Besides, the field groupSubclass indicates the profiles of included VRUs and the number of VRUs, called hereinafter cardinality of the group of VRUs.

| Descriptive Name | objectClass |
|---|---|
| ASN.1 representation | ObjectClass ::= CHOICE {<br>vehicleSubclass VehicleSubclassType,<br>vruSubclass VruProfileAndSubprofile,<br>groupSubclass ObjectGroupSubClassType,<br>otherSubclass OtherSubclassType<br>} |
| Definition | Describes the classification of a detected object. The object can be classified into one of four categories: vehicle, VRU, group of VRUs and others. The classification is performed with a certain confidence.<br>The DF should include the following information:<br>• class: the class that best describes the detected object. Each class provides optional subclasses and an associated confidence for the subclass. The class should be set to one of the following<br>- vehicles: the detected object is of type vehicle.<br>- VRU: the detected object is of type single VRU.<br>- Group of VRUs the detected object is of type group of VRUs.<br>- other: the detected object is of another type. |
| Unit | — |

| Descriptive Name | ObjectGroupSubClassType |
|---|---|
| ASN.1 representation | ObjectGroupSubClassType ::= SEQUENCE {<br>groupType VRUProfiles,<br>groupSize CardinalitySize,<br>} |
| Definition | Describes the classification of a group of VRUs<br>The DF should include the following information:<br>DE groupType: the presence or not of the VRU profiles of VRUs included in the group of VRUs as specified in ETSI TS 103 300-3<br>DE groupSize: the number of VRUs included in the group of VRUs |
| Unit | — |

Consequently, a detected object classified as a VRU may be reported in a Perceived Object Container 360 either individually or with at least another detected object thereby forming a group of detected objects. In other words, the CPM 300 may report individual VRUs and/or groups of VRUs.

When the Perceived Object Container 360, then the description information of the group of the objects is adapted, as follows:

- DE timeOfMeasurement corresponds to the time difference between the generation of the CPM and the time of the measurement of the last object updated in the reported group;
- DE objectConfidence corresponds to the minimal confidence among the confidences of the objects of the reported group;
- DE objectRefPoint corresponds to the reference point of one of the objects of the reported group or the barycentre of the reference points of the objects of the reported group;
- DEs xDistance, yDistance and zDistance correspond to the mean of the distances according to the x, y, z axis of the objects of the reported group;
- DEs xSpeed, ySpeed and zSpeed correspond to the mean of the speeds of the objects of the reported group;
- the DEs xAcceleration, yAcceleration and zAcceleration corresponds to the mean of the speeds according to the x, y, z axis of the objects of the reported group
- DE yawAngle corresponds to the means of the yaw angle of the objects of the reported group;
  - DE planarObjectDimension1, planarObjectDimension2, and verticalObjectDimension corresponds to the union of the dimensions of the objects of the reported group. These DEs may define an area, e.g. a polygon whose sides constitute the group boundaries;
- DE objectAge corresponds to maximum age among the ages of the objects of the reported group;
- DE dynamicStatus corresponds to the majority status of the objects of the reported group;
- DE groupSize corresponds to the number of objects included in the reported group.
- DE groupType corresponds to the presence or not of each VRU profile as specified in ETSI TS 103 300-3 amongst the profiles of objects included in the reported group.

Figure 7:
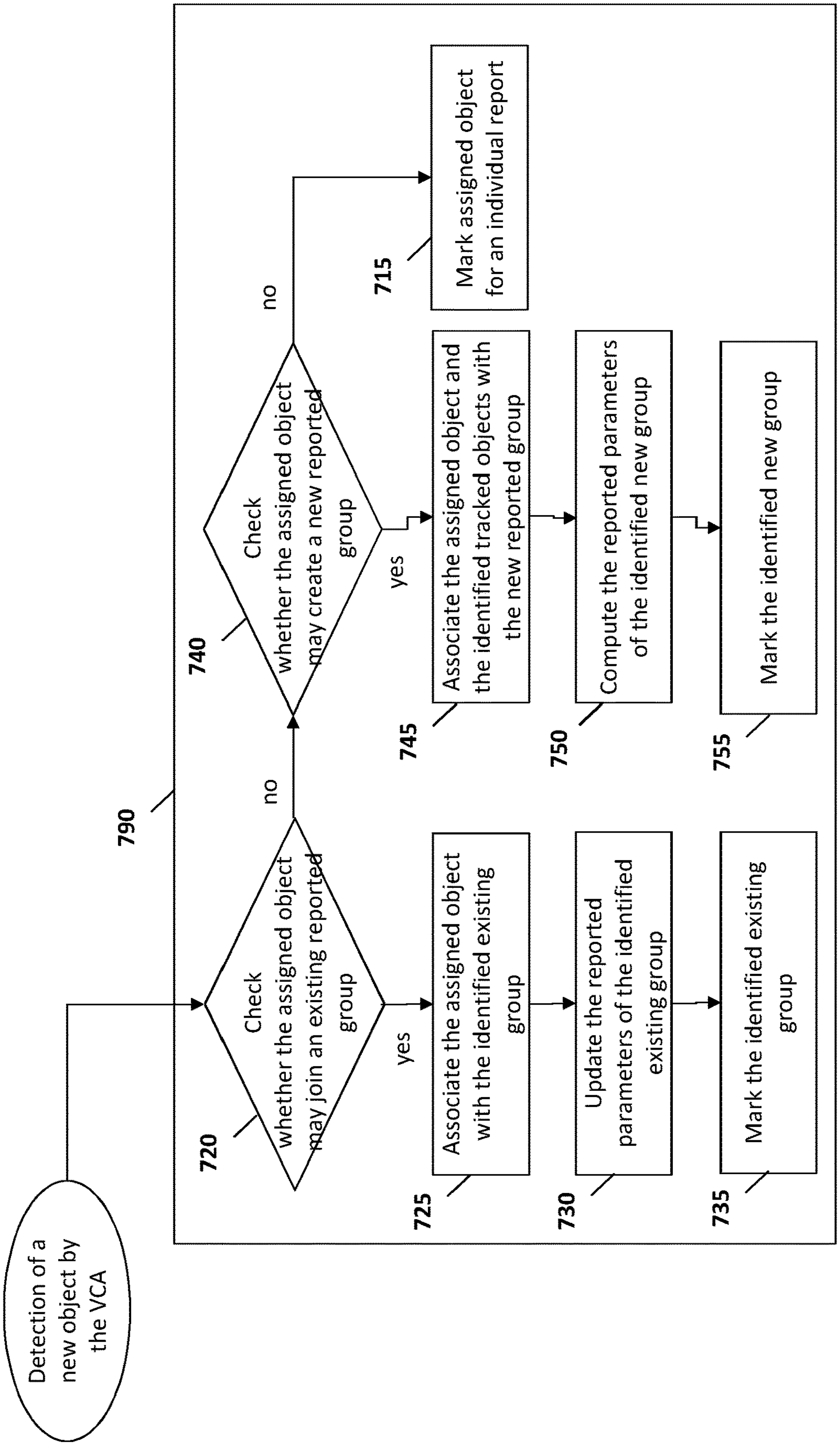
FIG. 7 schematically illustrates, using a flowchart, steps of a method illustrating reporting rules to be applied to assigned object which are systematically marked to be reported by the next CPM to be transmitted.
Figure 8:
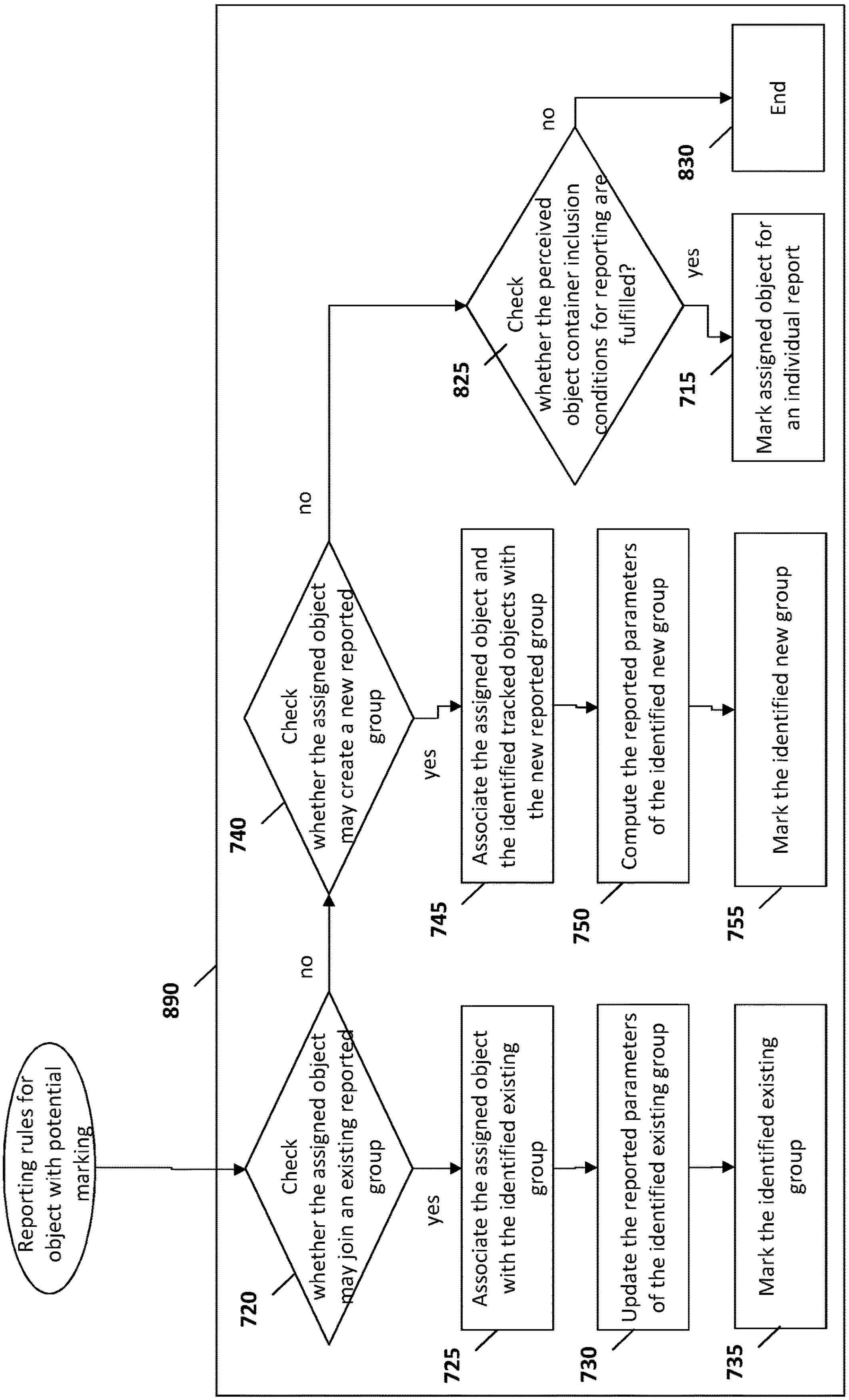
FIG. 8 illustrates, using a flowchart, steps of a method illustrating reporting rules to be applied to an assigned object which was previously individually tracked.
Figure 9:
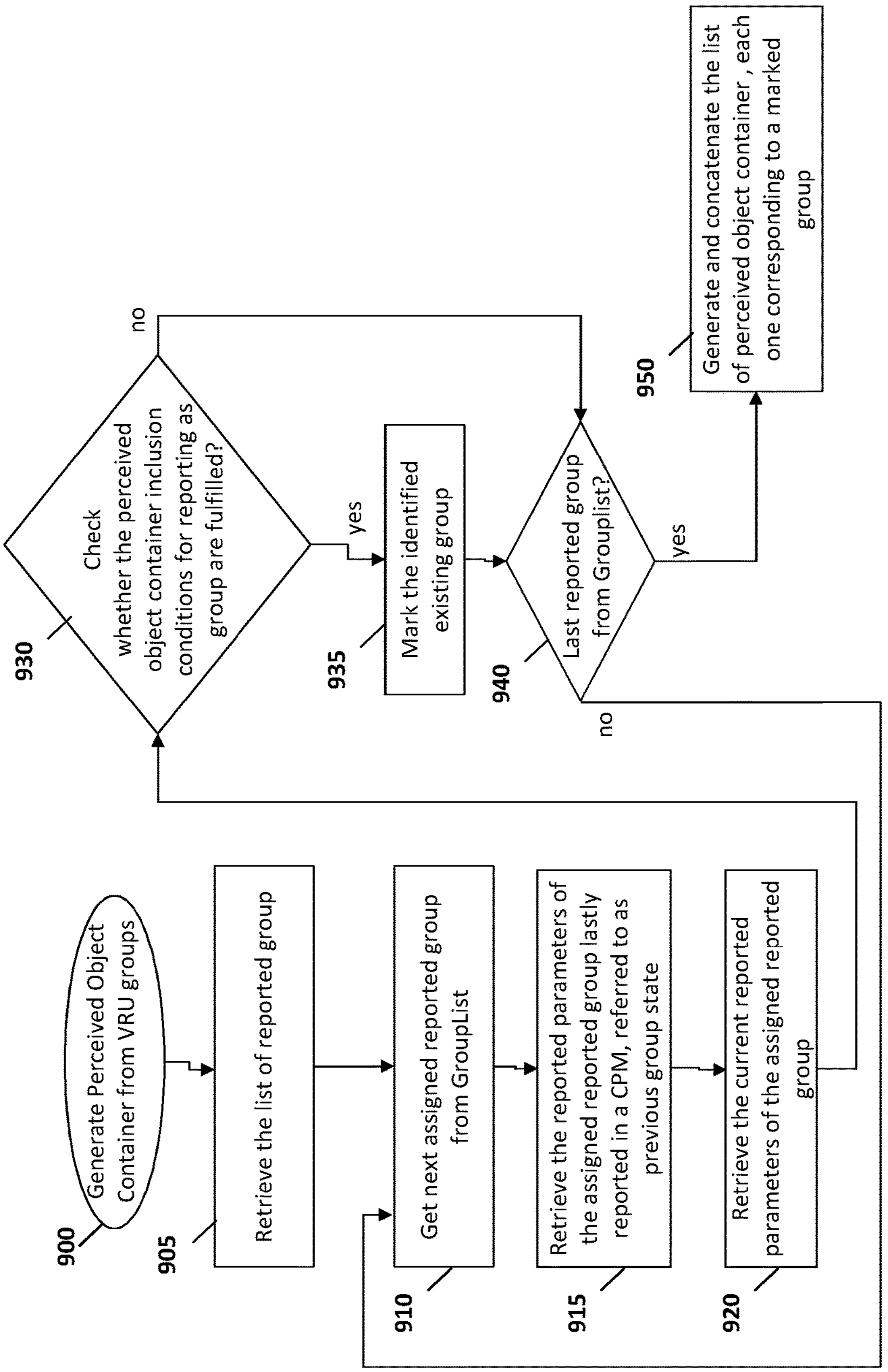
FIG. 9 illustrates, using a flowchart, steps of a method illustrating reporting rules to be applied to an assigned object which was previously tracked within a reported group of detected objects.

In order to better understand the formation and modification of the groups, and further their reporting within CPMs, reference is now made to FIGS. 7 to 9.

VCA module 121 detects a list of objects, comprising newly detected objects and already tracked objects (individually or included in a group). Based on all the detected objects, a list of detected objects is kept by the VCA module 121, and is referred to as ObjectList. The detected objects are then processed individually by to determine 1) whether these objects shall be reported and 2) whether such reporting should be performed individually or by group. The next object to be processed from the ObjectList is referred to as the assigned object hereinafter.

To do that, the present invention proposes reporting rules to be applied to the detected objects, as described in FIGS. 7-10. These reporting rules are specified for newly tracked objects (FIG. 7), already individually tracked objects (FIG. 8), already tracked objects by group (FIG. 9). The application of such rules is then described in reference to FIG. 10, in view of preparing the reporting of detected object using a CPM.

FIG. 7 illustrates an example of reporting algorithm for newly detected objects, referred hereinafter as assigned object. Each time a new object is detected by the VCA module 121, the object is automatically marked in order to be reported in the next CPM to be transmitted.

The reporting algorithm first comprises, at step 720, a step of checking whether the assigned object may join an existing reported group.

As mentioned before, the clustering joining operations as defined in ETSI TS 103 300 are applied and mainly consist in comparing the current position and kinematic information of the marked object with the ones of the reference point of the existing reported group.

For example, an assigned object may join an existing reported group if these joining conditions are fulfilled:

- the existing reporting group has not reached its maximal size maxGroupSize (i.e. the group cardinality of the existing reported group is inferior to the DF maxGroupSize of DE groupSize);
- the assigned object is either comprised in the group dimensions, or is at a certain distance from the reference point of the existing reported group, the distance being inferior to a given threshold, maxClusterDistance; and
- the difference between the velocity of the assigned object and the velocity of the existing reported group is less than a given threshold, maxClusterVelocityDifference.

According to some embodiments, the parameters maxGroupSize, maxClusterDistance and maxClusterVelocityDifference may be not fixed. For example, these parameters may be modified to take into account environment condition.

As an example, if the congestion control module of the originating ITS-S detects that there is a potential bandwidth congestion or if a large number of objects is detected in the scene, the parameters maxGroupSize, maxClusterDistance and maxClusterVelocityDifference may be increased temporarily to increase the number of objects included in groups and thus decrease the number of elements reported in the CPM. Thus, considering that the bandwidth for messages is limited, such parameters may help to keep the size of the messages low by decreasing the number of objects to report.

According to some embodiments, the values of the parameters maxGroupSize, maxClusterDistance and maxClusterVelocityDifference are fixed at the initialization of the system.

Next, if an existing reported group is identified, i.e. meaning that all the conditions are fulfilled for the assigned object to join the group, then next step is 725. If not, next step is 740.

At step 725, if such joining is possible, the assigned object is associated with the existing group identified at step 720. Therefore, the reporting of the assigned object will be through the identified existing group, and not individually. At step 730, the description information of the existing group of objects, contained within the Perceived Object Container associated with this group, are updated. Next, at step 735, the identified existing group is marked in order to be reported by the next CPM to be transmitted.

In case where one of the conditions is not fulfilled, i.e. that the assigned object cannot be added to an existing group, at step 740, it is checked whether the marked object may create a new group for the reporting.

To do this, the conditions of clustering creating operation as defined in ETSI TS 103 300 are applied, and mainly consist in a comparison between the current position of the marked object with at least one another object already tracked and previously reported individually, referred to as an identified tracked object. For example, conditions may be that the distance between the marked station and the identified tracked object is less than a given threshold, maxClusterDistance, and the difference of velocity between the marked station and the identified tracked object is less than a given threshold, maxClusterVelocityDifference.

According to some embodiments, the parameters maxClusterDistance and maxClusterVelocityDifference may be modified to take into account environment conditions. For example, maxClusterDistance and maxClusterVelocityDifference may be increased temporarily to increase the number of objects included in groups and thus decrease the number of elements reported in the CPM.

If the clustering conditions are fulfilled, the next step is 745. Otherwises, the next step is 715.

At step 745, if such a group creation is possible, then the assigned object and the identified tracked objects are associated and joined in order to form a new reported group. Next, at step 750, the description information, i.e. reported parameters of the new reported group generated at step 740, are computed. Then, in order to ensure that the new reported group is including within the next CPM to be transmitted, at step 755 the new reported group generated at step 740 is marked.

In case where it is impossible to create a new group, then the assigned object is marked to be reported individually in the next CPM to be transmitted.

In the rest of the documents, steps 720-725-730-735-740-745-750-755 are referred to as the global step 790, aiming at selecting the reporting rules for a newly detected object to be automatically marked, such that it is automatically reported in the next CPM to be transmitted.

According to some embodiments, additional conditions may be added when creating or joining a newly detected object to a group. For example, groups may be by type of VRUs.

Regarding the other detected objects, notably the ones that had already been tracked by the VCA module 121 and not included in a group, and which are still detected by the VCA module 121, their marking for them to be reported by the next CPM is now described with respect to FIG. 8.

FIG. 8 schematically illustrates, using flowcharts, steps of a communication method with the reporting rules for an assigned object already tracked individually.

These rules are applied for each assigned object from the ObjectList already tracked individually.

Upon the launch of the algorithm, at step 720, it is checked whether the assigned object may join an existing reported group. If such joining is possible, the same steps 720-735 as the ones described in relation to FIG. 7 applies. In other, words, if such joining is possible, the joining is performed, description information of the group is updated and the existing group is marked in order to be reported in the next CPM to be transmitted.

Then, it is checked, at step 740, whether the assigned object may create a new reported group. If such creation is possible, the same steps 740-755 as the ones described in relation to FIG. 7 applies. In other, words, if such creation is possible, the group is created, description information of the group is computed and the new group is marked in order to be reported in the next CPM to be transmitted.

In case where the assigned object may neither join an existing group or a newly created group, it is checked at step 825 whether the Perceived Object Container inclusion conditions for reporting are fulfilled. Perceived Object Container inclusion conditions are a list of one or more conditions to be fulfilled in order to determine an already tracked object to be reported once again: for example, such reporting may be performed when the description information of the already tracked object has substantially evolved since the last reporting, or if the reporting of this object has not been performed for a predefined time period. According to some embodiments, Perceived Object Container inclusion conditions for reporting may be in line with the "Perceived Object Container Inclusion Management" procedure specified in standard ETSI TS 103 324.

If the inclusion conditions are not fulfilled, then the already tracked object is not reported, and the algorithm stops at step 830. Otherwise, then the already tracked object is marked for reporting individually in step 715.

Steps 720-725-730-735-740-745-750-755-825-715-830 are referred to as step 890, constituting reporting rules for an object which may be marked for reporting, for objects which has been previously tracked individually.

FIG. 9 illustrates the reporting rules for already tracked groups aiming at determining whether the existing group shall be marked in view of its reporting within the next CPM to be transmitted.

It is thus proposed to enable the reporting of an already tracked group whose description information has evolved since the last CPM has been sent, including previous description information of this already tracked group. This allows, in particular, to send updated description information when the already tracked group is subject to change.

In the case where the description information of the already tracked group has not changed since the sending of the last CPM including description information of this already tracked group, then the already tracked group is not marked to be reported in the next CPM to be transmitted.

According to some embodiments, such reporting rules are applied only when the cardinality of the group has not evolved. In this case, as described in relation to FIG. 7, when a new assigned object is added to an already tracked group, the group is systematically marked.

According to some embodiments, such reporting rules are applied, indifferently to all already tracked groups. In this case, a reporting condition may concern the cardinality of the already tracked group.

Before running the algorithm (step 900), the description information (including notably position and kinematic information, time of measurement) of the objects within the existing groups is updated accordingly the last information provided by the VCA module 121.

Then, at step 905, the list of reported groups referred to as GroupList is retrieved for processing by the algorithm. The reported groups refer to the list of the existing groups, previously reported by a CPM.

Next, at step 910, the next element of GroupList not yet processed is identified. It is referred to as assigned reported group.

Then, at step 915, the associated description information, i.e. the reported parameters of the assigned reported group lastly reported by a previous CPM, referred to as previous reported parameters, is retrieved.

Also, at step 920, the current description information, i.e. the reported parameters of the assigned reported group, referred to as current reported parameters, are retrieved. Next, at step 930, it is determined whether the assigned reported group will be marked or not to be reported in the next CPM to be transmitted. This may be performed by checking a list of perceived object container inclusion conditions.

For example, the list of perceived object container inclusion conditions may be in line with the Cluster VAM transmission management specified in the section 6.4.2 of the standard ETSI TS 103 300-3, as detailed as follows:

- the time period elapsed since the last time the assigned reported group was transmitted within a previous CPM exceeds a predefined threshold, T_GenVamMax;
- the Euclidian absolute distance between a previous and a current position of the reference point of the assigned reported group exceeds a predefined threshold, minReferencePointPositionChangeThreshold;
- the difference between the previous and the current estimated distance between the reference point of the assigned reported group and the boundary of the assigned reported group boundary exceeds a pre-defined threshold minGroupDistanceChange Threshold;
- the difference between a previous and a current estimated ground speed of the reference point of the assigned reported group is greater than a predefined threshold, minGroundSpeedChangeThreshold;
- the difference between the orientation of the vector of a previous estimated ground velocity and a current estimated ground velocity of the assigned reported ground is greater than a predefined threshold, minGroundVelocityOrientationChangeThreshold. The ground velocity is the vector defined by the precited DEs xSpeed, ySpeed and zSpeed;
- the number of type(s) of objects in the assigned reported group as previously reported is different from the current number of type(s) of the objects in the assigned reported group;
- the difference between a previous and a current cardinality of the assigned reported group is greater than a predefined threshold, minCardinalityChangeThreshold.

According to some embodiments, the parameters T_GenVamMax, minReferencePointPositionChangeThreshold, minGroupDistanceChangeThreshold, minGroundSpeedChangeThreshold, minGroundVelocityOrientationChangeThreshold, minCardinalityChangeThreshold may be fixed at the initialization of the system.

According to some embodiments, if any one of these conditions is fulfilled, the assigned reported group is marked to be reported to the next CPM to be transmitted. Otherwise, the reported group is not marked, i.e. is not to be reported in the next CPM.

Step 910-915-920-930-935-940 are repeated until every reported group from GroupList has been processed in order to determine whether or not it should be marked to be reported by the next CPM to be transmitted.

Figure 10:
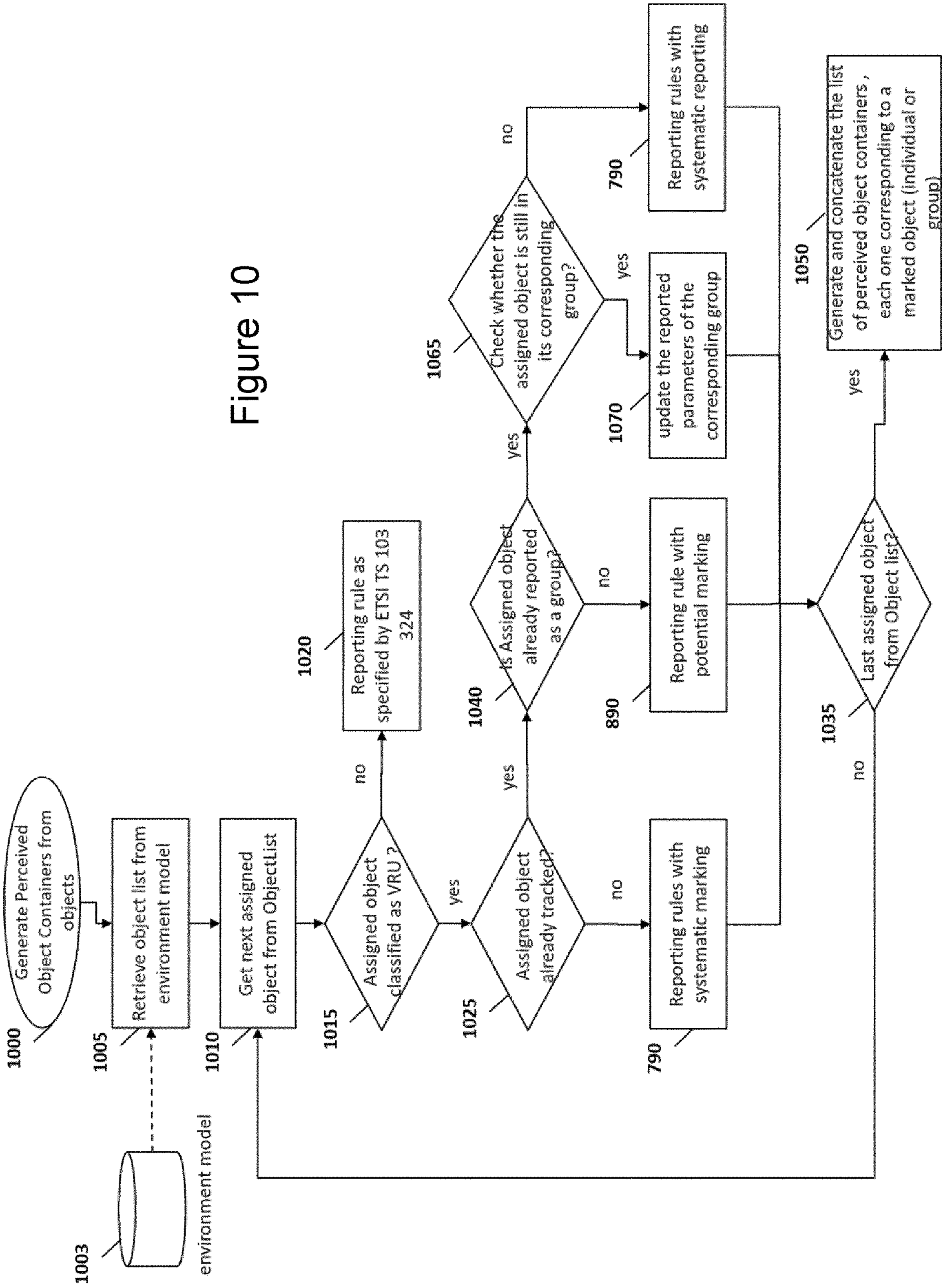
FIG. 10 schematically illustrates, using a flowchart, steps of a communication method for generating perceived object containers to be included in the transmitted CPM corresponding to the objects selected to be reported by the Collective Perception Service including groups of objects.

In order to better understand the generation of the next CPM to be transmitted, applying the previously described reporting rules, reference is now made to FIG. 10.

FIG. 10 schematically illustrates, using flowcharts, steps of a communication method for generating Perceived Object Containers to be included in the next to be transmitted CPM associating to the objects selected to be reported by the Collective Perception Service.

Upon starting the algorithm at step 1000, the list of detected objects stored in the database referred to as environment model 903 is retrieved at step 905. The environment model may be issued from the VCA module 121. The list of detected objects by the VCA module 121 is referred to as ObjectList.

Next, at step 1010, the next detected object from ObjectList not yet processed is obtained. It is referred to as the assigned object hereinafter.

Then, at step 1015 checks whether the assigned object has been classified as a VRU. In case the assigned object is not a VRU, then the specific "Perceived Object Container Inclusion Management" procedure specified in standard ETSI TS 103 324 is applied for reporting the assigned object within the CPM. Indeed, in this embodiment we consider that only VRUs can be reported in a group. Of course, as mentioned before, according to some embodiments, vehicles and VRUs may be reported in groups. In this case, steps described hereinafter for VRUs can also be used for vehicles.

If the assigned object is a VRU, then at step 1025, it is checked whether the assigned object has already been processed, i.e. has already been reported by the Collective Perception Service. In this case, said assigned object is consequently tracked since its first reporting. When the assigned object has not already been tracked, and is therefore a newly tracked object, at step 790, this object is automatically marked, and reporting rules for newly detected objects illustrated by FIG. 7 are applied.

If the assigned object has already been tracked, at step 1040, it is checked whether the assigned object is already reported within a reported group. In case where the assigned object has not been reported within a group, i.e. has been reported individually, at step 890, this object may be potentially marked, and reporting rules described in reference to FIG. 8 are applied.

If the assigned object has already been tracked within a detected group, at step 1065, it is checked whether the assigned object is still in its corresponding reported group.

To do that, it may be checked whether conditions are still fulfilled, e.g. the conditions of clustering creating operation as defined in ETSI TS 103 300 are applied. According to some embodiments, it mainly consists in a comparison between the current position of the marked object and the position of the reference point of previously reported group of detected objects.

For example, conditions may be that the distance between the marked station and the reference point of the reported group is still less than a given threshold, maxClusterDistance, and the difference of velocity between the marked station and the reference point of the reported group is still less than a given threshold, maxClusterVelocityDifference.

According to some embodiments, the parameters maxClusterDistance and maxClusterVelocityDifference may be modified to take into account environment conditions. For example, maxClusterDistance and maxClusterVelocityDifference may be increased temporarily to increase the number of objects included in groups and thus decrease the number of elements reported in the CPM.

In case where the assigned object fulfils the joining conditions, the assigned object is maintained in the tracked group. At step 1070, the reported parameters of the corresponding reported group are updated according to the newly detected description information. To determine whether or not the updated group should be marked so that its description information is included in the next CPM to be transmitted, the reporting rules, for already tracked group of objects, described with reference to FIG. 10, are applied.

These steps 1010 to 1070 (including steps 790 and 890) are repeated until all the objects in the list are processed. Then, at step 1050, Perceived Object Containers are generated for each marked object and each marked group of objects to be reported by the next CPM to be transmitted.

In a second embodiment of the second aspect of the invention, safety-critical categorization is taken into consideration when reporting detected objects either in group or individually. To do that, the group reporting may take into consideration safety-critical categorization information in order to determine 1) whether detected object should be reported by the next CPM to be transmitted, 2) whether the reporting should be individual or in a group.

Figure 11:
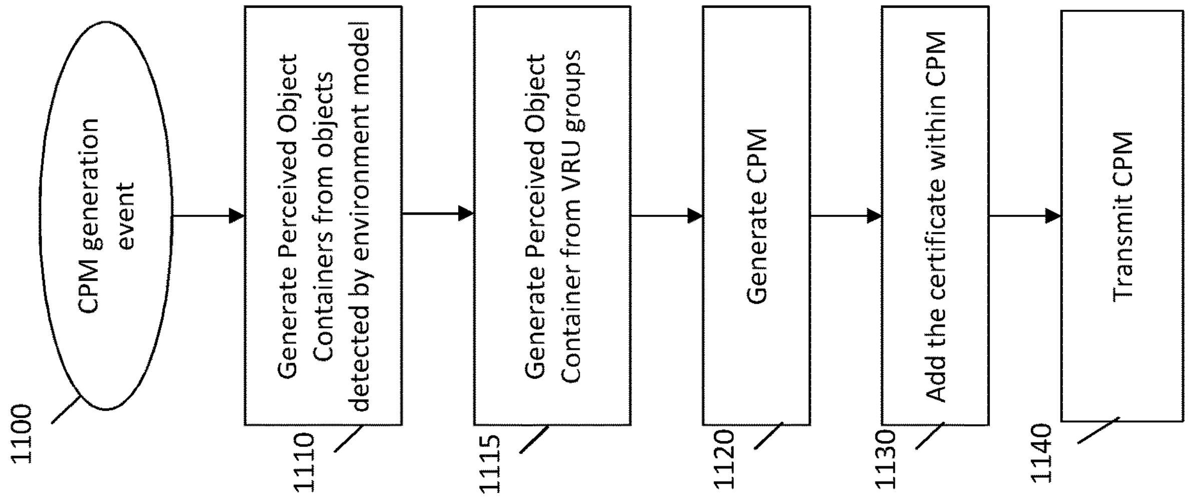
FIG. 11 schematically illustrates, using a flowchart, steps of a communication method for transmitting a CPM including a safety-critical categorization information according to a second embodiment of the present invention.

FIG. 11 schematically illustrates, using flowcharts, steps of a communication method for transmitting a CPM including safety-critical categorization information, according to the second aspect of the invention.

Upon the CPM generation event at step 1100, the perceived object containers 370 of the marked objects, at step 1110, and the marked group of objects, at step 1115, are generated.

Figure 12:
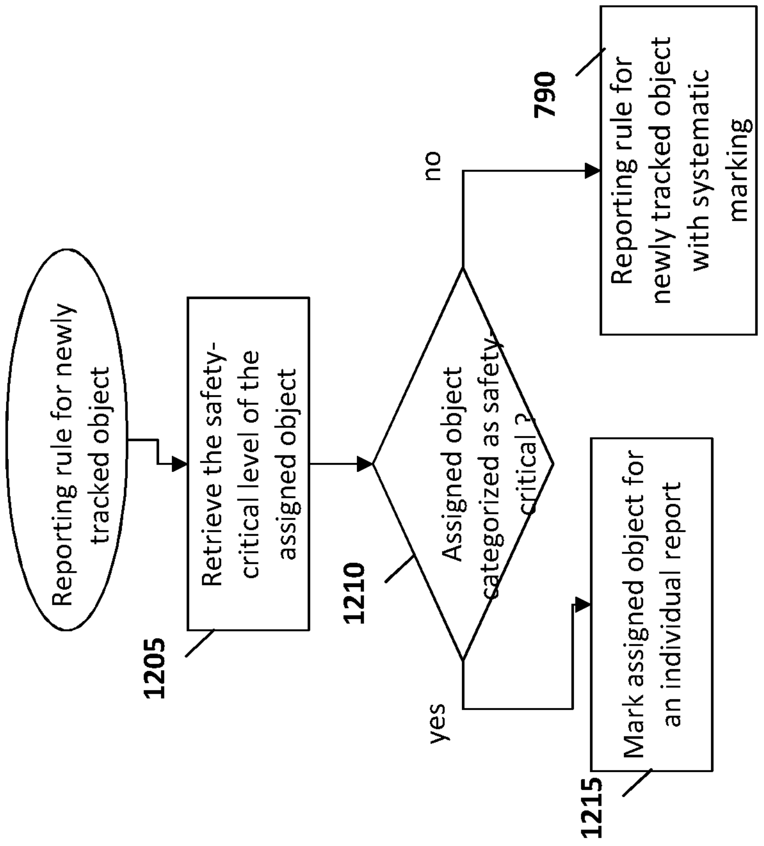
FIG. 12 schematically illustrates, using a flowchart, steps of a method illustrating reporting rules to be applied to an assigned object which are systematically marked to be reported by the next CPM to be transmitted taking into consideration safety-critical categorization information associated with the assigned object.
Figure 13:
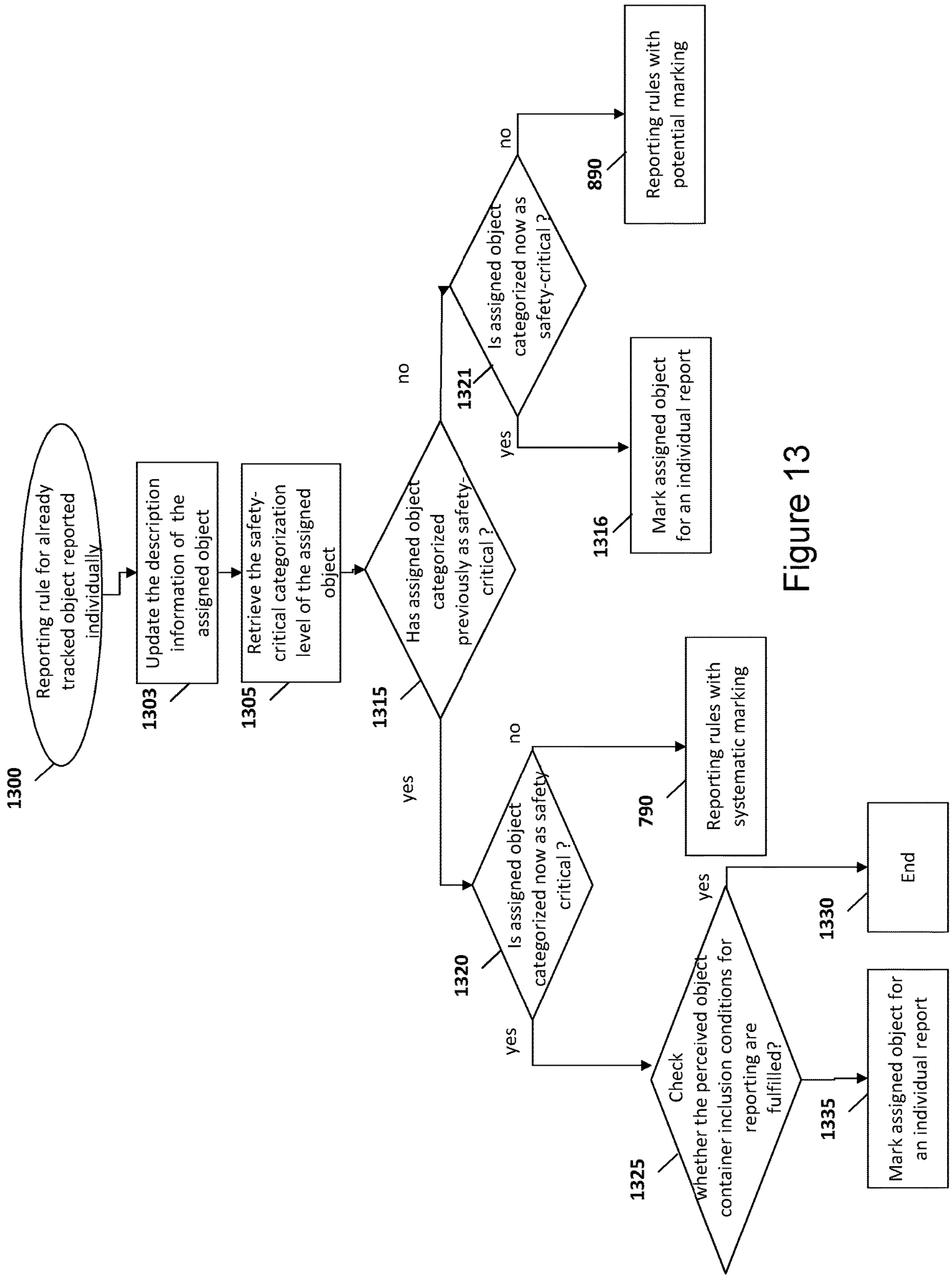
FIG. 13 illustrates, using a flowchart, steps of a method illustrating reporting rules to be applied to an assigned object which was previously individually tracked taking into consideration safety-critical categorization information associated with the assigned object.
Figure 14:
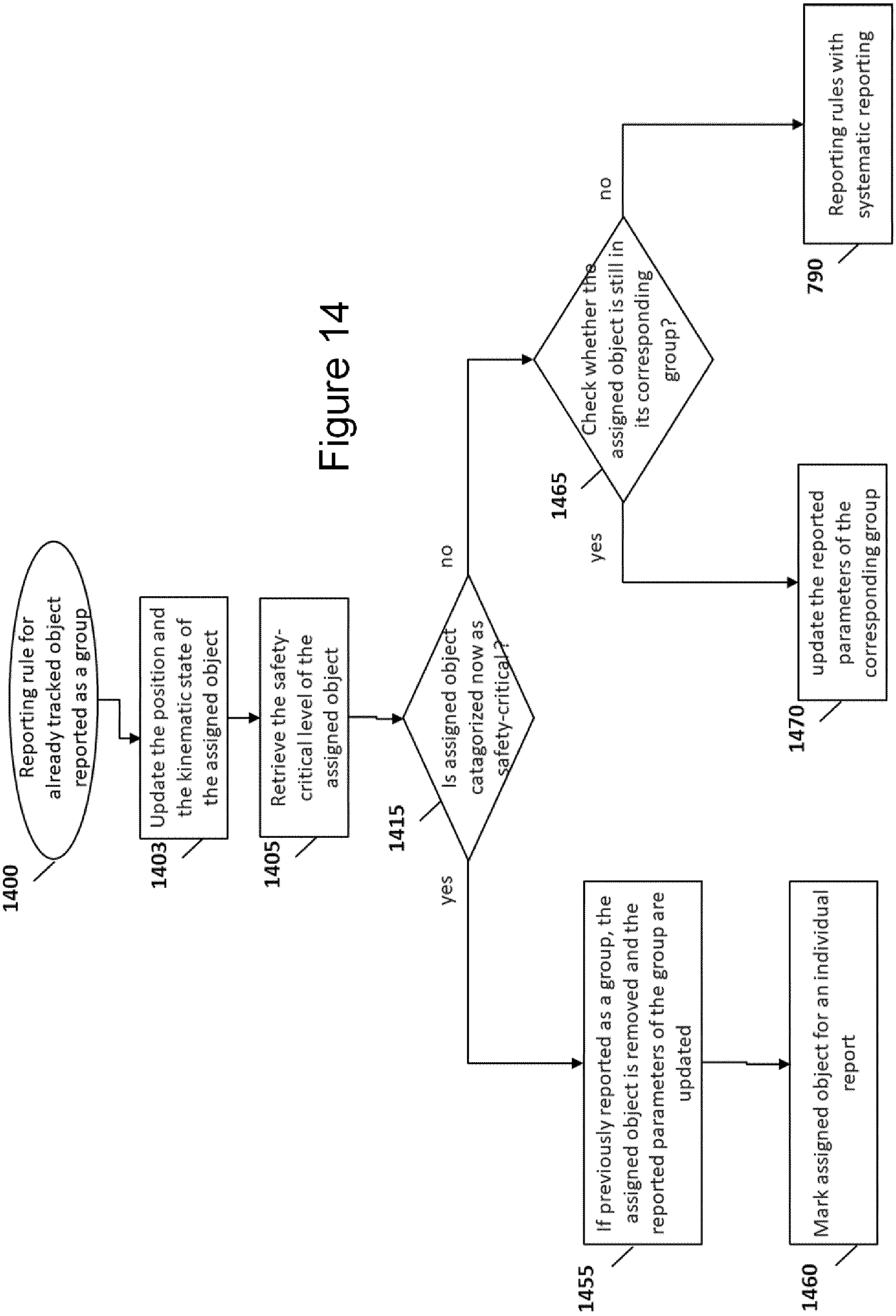
FIG. 14 illustrates, using a flowchart, steps of a method illustrating reporting rules to be applied to an assigned object which was previously tracked in a reported group, while taking into consideration safety-critical categorization information associated with the assigned object.

According to this embodiment, the selection of marked objects and the corresponding type of reporting, i.e. individually or as a group, may take into account the safety-critical categorization information of the detected objects, as described in more details in relation to FIGS. 12, 13 and 14.

Optionally, before the generation of the object containers of the marked objects and/or the marked groups of objects at step 510, it may be contemplated to apply redundancy mitigation technics.

For example, objects and/or groups of objects, which have already been reported recently by other ITS stations can be removed from the list of the marked objects to be reported in the next CPM to be transmitted.

However, an object and/or a group of objects, which are associated with a safety-critical level higher than the threshold SafetyCriticalLevel_Threshold, should not be subject to redundancy mitigation techniques. In other words, regardless of whether it has already been reported by the same or by other ITS-S, an object or a group of objects should be included in the next CPM to be transmitted if its safety-critical level is higher than SafetyCriticalLevel_Threshold. Therefore, for such safety-critical objects, redundancy mitigation technics are disabled.

Such redundancy mitigation technics may enable to reduce the number of marked perceived objects to be reported in the next CPM to be transmitted. It may be useful to limit risk of bandwidth congestion by decreasing the size and number of CPMs to be transmitted.

Then, at steps 1120, 1130 and 1140, the CPM is then generated and transmitted, similarly to steps 520, 530 and 540 as described hereinbefore with respect to FIG. 5.

In this embodiment, the certificate given by the specific certification authority and included within the CPM at step 1130, includes the permission authorizing the report of a safety information in CPM as described with reference to FIG. 4.

Reporting rules, for newly tracked objects and already tracked object (individually or in a group) are therefore adapted, as illustrated respectively at FIGS. 12, 13 and 14.

According to some embodiments, the detected objects considered as safety-critical object, are reported individually, enabling the receiving stations to quickly determine safety issues, by processing, for example, the Perceived Object Containers related to individual objects first.

In the reporting rules for newly tracked objects of FIG. 12, upon starting the algorithm, at step 1205, the safety-critical categorization information related to the assigned object is retrieved from the safety-critical categorization module 122.

In case where the assigned object is considered as a safety-critical object, at step 1210, the assigned object is marked in order to be reported individually by the next to be transmitted CPM.

Otherwise, the reporting rules for newly tracked object, which is systematically marked, are applied at step 790. Such reporting enables a non safety-critical object to be reported within a group, when group joining or group creation conditions are fulfilled.

In the reporting rules for already tracked object, previously reported individually, of FIG. 13, when starting the algorithm at step 1300, the description information (including notably position and kinematic information, time measurement) of the assigned object is updated, based on the VCA module detections.

Next, at step 1305, the current safety-critical categorization of the assigned object given by the safety-critical module is retrieved. In addition, the previous assigned safety-critical categorization information of the assigned object is stored in memory.

Then, at step 1315, it is checked whether the assigned object was previously categorized as a safety-critical object, based on previous a safety-critical categorization information stored in memory.

If the assigned object was a non-critical safety object and becomes a safety-critical object at step 1321, the assigned object is marked, at step 1316, in order to be reported individually in the next CPM to be transmitted. If the assigned object was and is still a non-critical safety object, at step 890, rules for reporting an already individually tracked objects (as described in relation to FIG. 8) are applied to determine whether the assigned object should be marked for reporting.

If the assigned object was a critical safety object and becomes a non safety-critical object, at step 1320, the assigned object is systematically marked for reporting, and the reporting rules described in step 790 of FIG. 7 are applied. Thus, according to this embodiment, such objects are treated as newly detected objects.

If the assigned object was a critical safety object at step 1315 and is still a safety-critical object, at step 1320, it is checked at step 1325 if the assigned object which has already been reported should be reported once again. To do that, it may be checked whether object container inclusion conditions for a safety critical object are fulfilled. An object is included if it has a severity higher to a threshold value (SafetyCriticalLevel_Threshold and if the time elapsed since the last time the object was included in a CPM exceeds T_GenCpmMaxCritical. If this is the case then the assigned object is marked for individual reporting by the next CPM to be transmitted at step 1335. Otherwise, the algorithm ends at step 1330.

FIG. 14 illustrates, using flowcharts, steps of a method illustrating reporting rules to be applied to an assigned object which was previously tracked in a reported group, while taking into consideration safety-critical categorization information associated with the assigned object.

Upon starting the algorithm at step 1400, step 1403 updates the description information of the assigned object (including notably position and kinematic information, time measurement). Next, at step 1405, the current safety-critical categorization information of the assigned object given by the safety-critical module is retrieved.

Next, at step 1415, it is checked whether the assigned object is now categorized as a safety-critical object, based on the current safety-critical categorization information, and on a registered previous safety-critical categorization information.

If the assigned object is a non-critical safety object, it is then checked, at step 1465, whether the assigned object is still in its corresponding reported group. To do that, it is checked whether conditions are still fulfilled, notably regarding the thresholds maxClusterDistance and maxClusterVelocityDifference, as described at step 740. If the assigned object is still in the reported group, then at step 1470, the description information of the reported group is updated, based on the current description information of the assigned object. To determine whether or not the group should be reported by the next CPM to be transmitted, the reporting rule illustrated in FIG. 9 may be applied. If the conditions are not fulfilled to maintain the assigned object within the reported group, the assigned object is removed from the reported group and the reported parameters of the identified existing reported group are updated by taking into account the removal of the assigned object. Then, at step 1460, the assigned object is marked for individual reporting by the next CPM to be transmitted, and reporting rules for newly detected object 790 are applied in order to determine whether or not the assigned may be reported in another group or individually.

If the assigned object is a critical safety object, and if the assigned object was previously reported within a group, at step 1455, the assigned object is removed from the reported group and the reported parameters of the identified existing reported group are updated by taking into account the removal of the assigned object.

Next, at step 1460, the assigned object, which is a safety-critical object, is marked for individually reporting by the next CPM to be transmitted.

Figure 15:
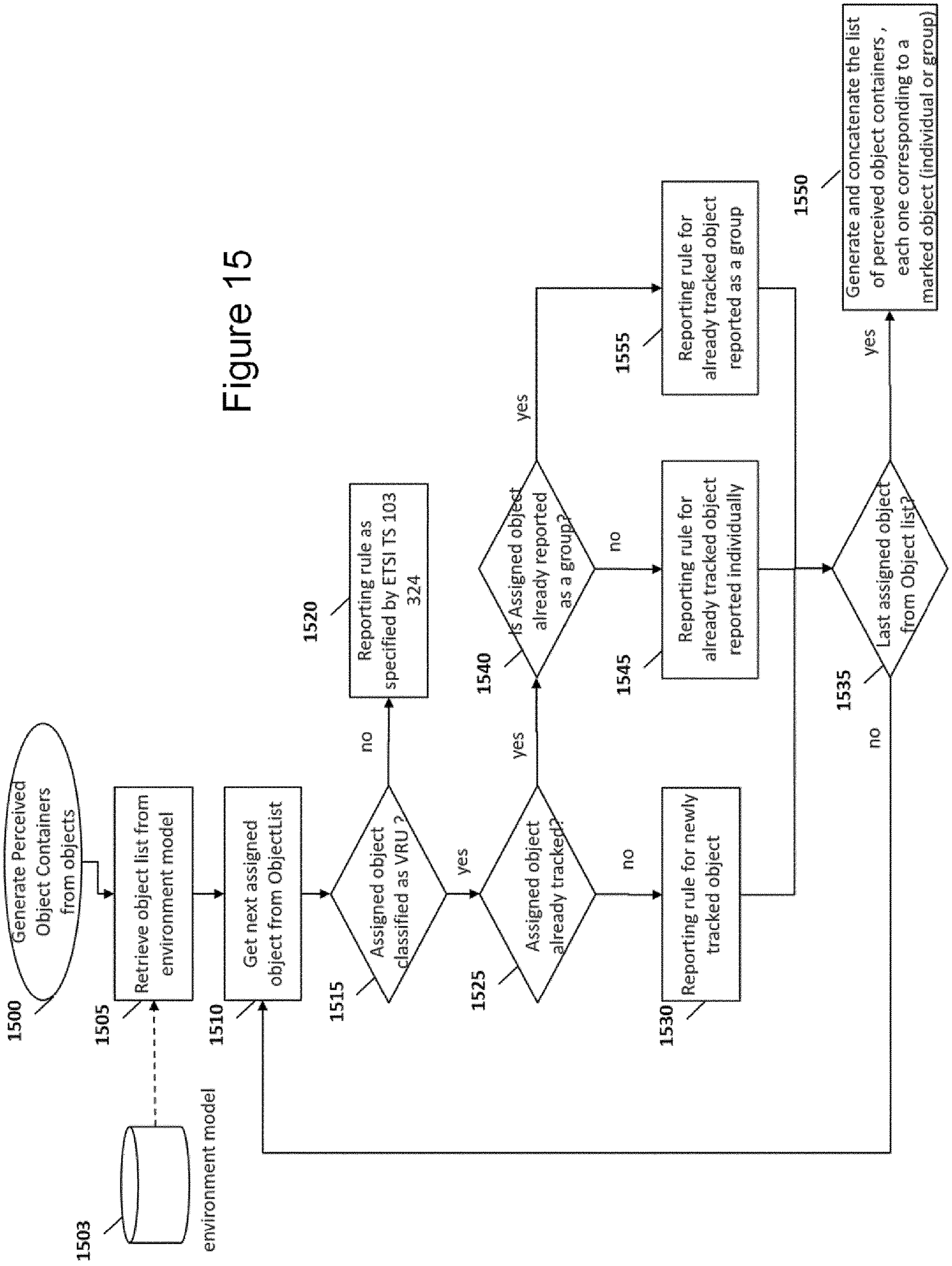
FIG. 15 schematically illustrates, using a flowchart, steps of a communication method for transmitting a CPM including a safety-critical categorization information according to a second embodiment of the present invention, where detected VRUs may be grouped into groups while taking into consideration safety-critical categorization information associated with the assigned object.

In order to better understand, FIG. 15 schematically illustrates, using flowcharts, steps of an example of communication method for generating Perceived Object Containers to be included in the next CPM to be transmitted. In the proposed method, the Perceived Object Containers correspond to the objects selected to be reported by the Collective Perception Service applying reporting rules as detailed hereinbefore, while taking into account the safety-critical categorization information, accordingly in accordance with embodiments of the second embodiment of the second aspect of the invention.

At the launch of the method, at step 1500, steps 1505 to 1520 are similar to the ones 1005 to 1020 of FIG. 10.

In case where the assigned object is a newly tracked object, then at step 1530, the reporting rules described in FIG. 12 are applied.

In case where the assigned object has been already tracked individually, then at step 1545, the reporting rules described in FIG. 13 are applied.

In case where the assigned object has been already tracked in a group, then at step 1555, the reporting rules described in FIG. 14 are applied.

These steps 1510 to 1555 are repeated until all the objects of in the list are processed. Then, at step 1550, Perceived Object Containers are generated for each marked object and each marked group of objects to be reported with by the next CPM to be transmitted.

Therefore, in this proposed method, an assigned object may:

- be systematically reported individually when it is categorized as a safety-critical object;
- be reported in a group when it is categorized as a non safety-critical object.

According to some embodiments, the CPM may not comprise information related to safety-critical categorization of the reported objects. In this case, the safety-critical categorization of the reported objects may be implicit, and may be deduced, at the receiving ITS-S, depending on whether the assigned object is within a group: when the assigned object is reported within a group, the receiving station deduces that the assigned object, together with all the object within the group, is categorized as non safety-critical object). Such embodiments are advantageous, as the implicit signalling of the safety-critical categorization of the reported objects enables to reduce the CPM payload. In this embodiments, only safety-critical categorization information related to non safety-critical detected objects is provided.

Figure 16:
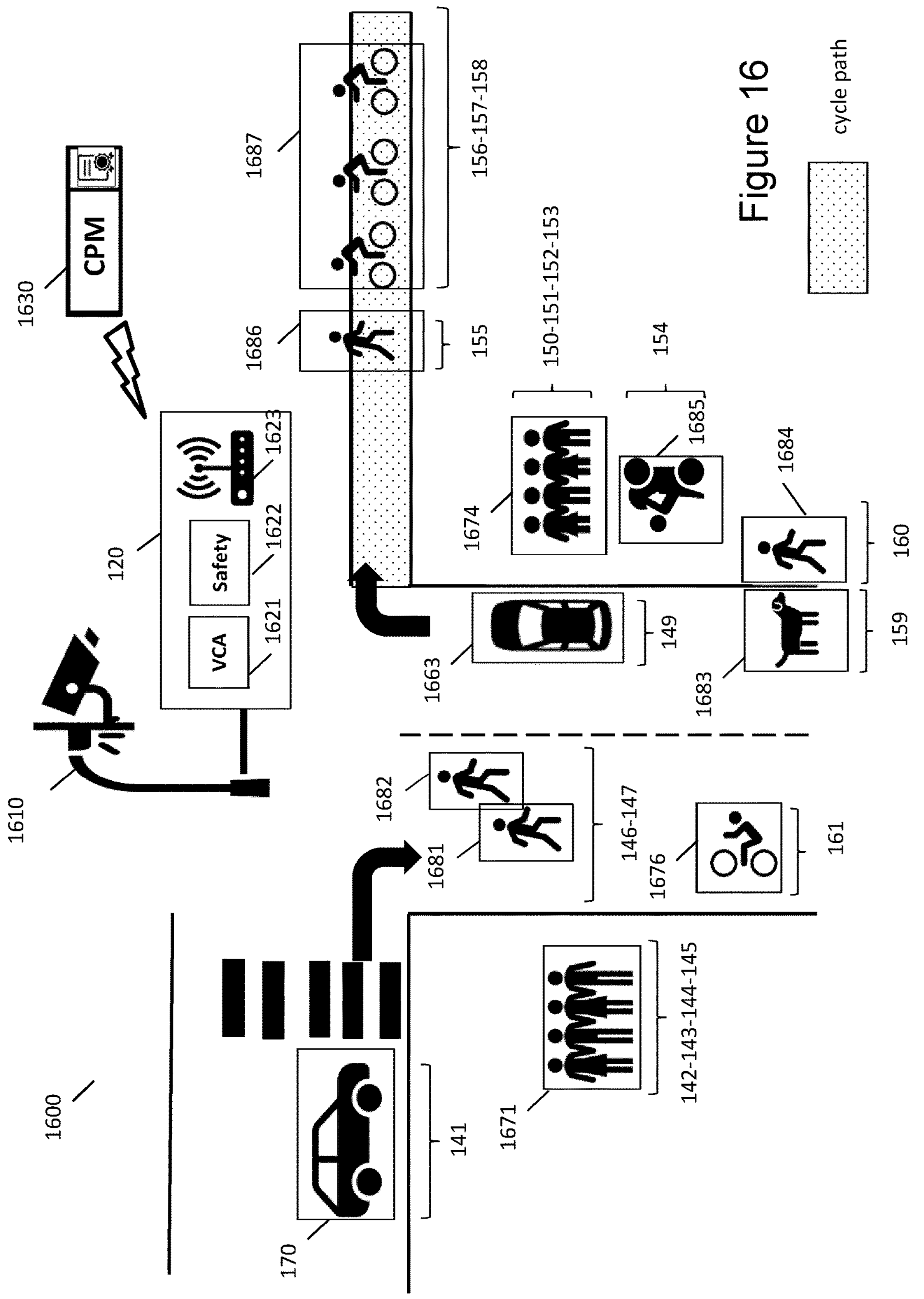
FIG. 16 illustrates the same exemplary ITS of FIG. 1 in which objects reporting within groups according to the second embodiment is implemented, where detected VRUs are grouped into groups while taking into consideration safety-critical categorization information associated with each VRU.

When safety-critical categorization information is taken into account, the obtained group of objects illustrated in FIG. 16, differs from the one obtained without it, as is illustrated in FIG. 6.

When applying said method, the detected objects categorized as safety-critical are now reported individually and not as a group: for example, pedestrians 146 and 147 crossing a street outside a pedestrian crossing are no longer reported within the reported group 172, but individually 1681 and 1682 instead. Thus, although the pedestrians are both considered as safety-critical objects, the method proposes to report them individually.

Similarly, dog 159 on the road is no longer reported within the reported group 172, together with pedestrian 1684, but individually 1583. Unlike pedestrians 160, dog is 159 is considered a safety-critical object.

Further, motorcycle 154 riding on the sidewalk is no longer reported within the reported group 174, together with pedestrians 150-153, but individually 1685, and pedestrian 155 on a street cycle path is no longer reported within the reported group 175, together with cyclist 156-158, but individually 1586 instead.

Bicycle 161 riding in wrong direction is still reported individually 1576 though.

According to some embodiments, the grouping may be also performed for detected object which are not VRUs, for example vehicles.

In a third embodiment of the second aspect of the invention, safety-critical categorization is also taken into consideration when reporting detected objects.

According to some embodiments, the described method of the second aspect of the invention may be adapted such that an assigned object may join an existing reported group only if it has the same safety-critical categorization as the existing group. Similarly, a new group may be created, when, further to the precited conditions, an assigned object and an identified tracked object have the same safety-critical categorization.

In other words, in such embodiments, the Collective Perception Service may allow safety-critical objects to be included in groups only containing safety-critical objects, when group joining conditions or group creation conditions are fulfilled.

Therefore, group of objects which may be either categorized as safety-critical or as non-safety-critical, are homogeneous groups of respectively safety-critical objects and non-safety-critical objects.

For example, an assigned object may join a group having the same safety-critical categorization as its own. For example, an assigned object may create a new reported group only if the assigned object and the other already tracked object to be included in the reported group have the same safety-critical categorization.

To do that, algorithms presented in relation to the second embodiment of the second aspect of the invention, are adapted as follows.

First, in case of a newly detected object, the conditions for an assigned object to join an existing group (step 720 of FIG. 7) and the conditions for creating a new reported group (step 740 of FIG. 7) may further include a condition regarding the safety-critical categorization of the assigned object and/or the objects within the existing group, and/or the identified tracked object involved in the creation of the new reported group. Same additional conditions related to the safety-critical categorization applies, in case of a detected object which has been previously reported individually (step 890, FIG. 8, same steps 720 and 740).

Such a condition regarding the safety-critical categorization may consist in checking whether the safety-critical categorization of the newly detected object or the previously tracked object that has previously been reported individually has the same safety-critical categorization as the objects within the existing group, or the identified tracked object involved in the creation of the new reported group. Thus, only objects sharing the same safety-critical categorization may be reported together within a group.

In the case of the assigned object is a previously tracked object, reported with a reported group, (FIG. 14), at step 1465, the conditions to determine whether the assigned object is still within the reported group may further comprise a condition regarding the safety-critical categorization of the assigned object and/or of the reported group. For example, when the safety-critical categorization of the assigned object changes, and become different from the safety-critical categorization of the reported group, the assigned object is no longer within the reported group, and the rules defined at step 790 are applied. In other words, when the safety-critical categorization of an object within a reported group changes, the object is reported independently from the reported group, it is instead reported individually or with another group, according to the rules applied at step 790.

CPMs, generated by methods according to the various described embodiments, are received by other ITS-S, referred as to receiving ITS-S.

According to some embodiments, when receiving a CPM including a safety-critical categorization information associated with a detected object, the receiving ITS-S processes the CPM in order to determine whether the detected object is critical or not for the safety of the area monitored by the originating ITS-S. The CPM may thus use the safety-critical categorization information in order to quickly determine a safety risk.

According to some embodiments, when receiving a CPM including at least one group of detected objects, the receiving ITS-S may quickly determine information related to a group, such as the description information described hereinbefore which may be contained in the Perceived Object Container. Such information my further contain safety-critical categorization information common to all the objects of the group of detected objects. This enables the station to process the group of detected objects as an entity within the ITS system, and therefore in some embodiments, to determine whether some object poses a safety risk to the area.

In some embodiments, safety-critical categorization is taken into consideration for triggering the generation of a new CPM. To that end, it may be contemplated identifying a particular situation (or event) and/or modifying the transmission frequency of CPMs when a safety-critical object is detected in the monitored area.

For example, when embedded sensors of the originating ITS-S detect a new object associated with a safety-critical level indicating a safety risk or the safety-critical level of a previously detected object is higher than previously, it may be contemplated to promptly send a new CPM, including information of the object, or to send a new CPM in a time period shorter than the time period elapsed between the last two CPMs sent by the originating ITS-S.

In other words, the CPM generation time depends on the safety-critical information associated with the objects to be reported within the next CPM, i.e. the marked objects. The CPM generation time is set considering a newly detected object with a high critical safety level or an increase in safety-critical level of a previously detected object.

Such an embodiment enables to quickly alert the surrounding ITS-S of a safety-critical situation involving for example a newly detected object categorised as a safety-critical object.

Figure 18:
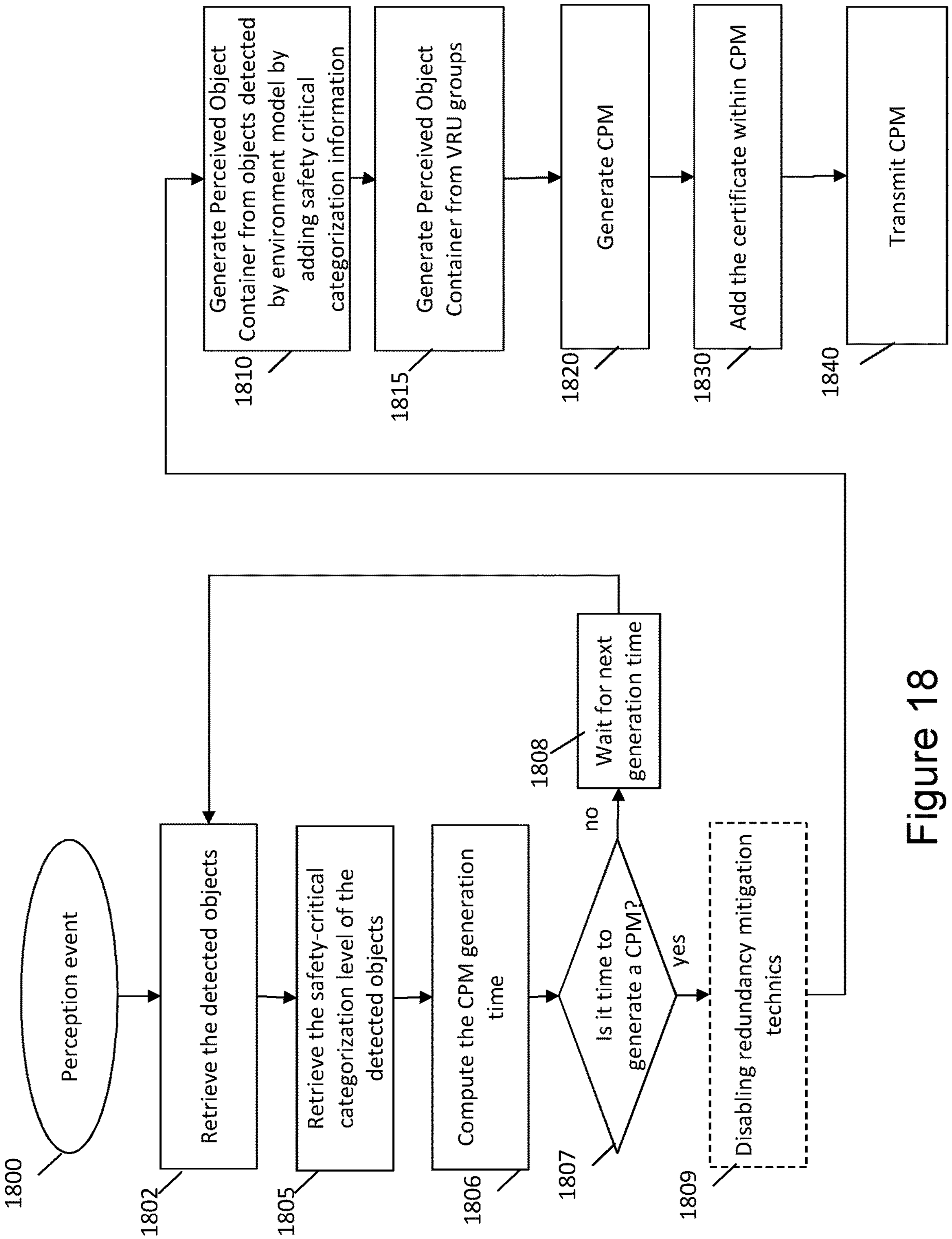
FIG. 18 schematically illustrates, using a flowchart, an example of steps of a communication method for transmitting a CPM including a safety-critical categorization information according to another embodiment of the present invention, where detected VRUs may be grouped into groups while taking into consideration safety-critical categorization information associated with the assigned object for triggering transmission of the CPM.

An example of such embodiments is now described in reference to FIG. 18, which schematically illustrates, using a flowchart, an example of steps of a communication method for triggering transmission of a CPM including safety-critical categorization information upon detecting a safety risk, according to the fourth embodiment of the second aspect of the invention.

First, the illustrated method is launched upon the detection of a perception event.

A perception event may be either a dedicated timer event or an event triggered by information provided by the embedded sensors of the originating ITS-S.

According to some embodiments, the dedicated timer event may be associated with a timer configured to trigger perception event when time, selected between a minimum time value and a maximum time value, elapsed, as specified in TS 103 324 V0.0.22. The selected time should be chosen to be lower than the minimal time between the generation of two successive CPMs. In other words, the selected time referred to as T_GenCpmMinCritical should be lower than the value T_GenCpmMin defined in standard ETSI TS 103 324 (section 6.1.3.1 CP Message generation frequency management). Typically T_GenCpmMinCritical may be equal to 10 ms while T_GenCpmMin may be equal to 100 ms.

According to some embodiments, the perception event may be related to information provided by the embedded sensors of the originating ITS-S. Such information comprises data provided by the embedded sensors and analysed by the VCA module 121.

Such data may include data related to the detection of an object. For example, data may include data related to a newly detected object in the monitored area. For instance, such data may include information relating to a previously detected object whose description information has changed. For example, when the increase of the speed of a vehicle is detected, the safety-critical level of the vehicle may change to indicate that the vehicle constitutes a safety risk for the monitored area. Another example, when the movement of a pedestrian from a sidewalk to the roadway area outside of a crosswalk is detected, the safety-critical level of the pedestrian may change to indicate that the pedestrian constitutes a safety risk for the monitored area.

Upon the detection of a perception event, at step 1802, the most recent state vectors, i.e. description information, are retrieved for all the perceived objects with a sufficiently high confidence level. For each detected object, the associated confidence level is evaluated and compared to a predetermined confidence threshold. Therefore, a detected object which does not have a sufficient confidence level, is not reported in a CPM.

Next, at step 1805, for each perceived object, a current safety-critical categorization level is determined. As explained hereinbefore, the safety-critical module 122 associates a safety-critical level with each perceived object.

Then, at step 1806, the next CPM generation event time T_GenEvent, i.e. the time at which the new CPM should be generated, is determined.

It is recalled that according to standard TS 103 324 V0.0.22, the time elapsing between two consecutive CPM generation events denoted T_GenCpm should be chosen in a range of values defined by a minimum value denoted T_GenCpmMin and a maximum value denoted T_GenCpmMax (i.e. T_GenCpmMin≤T_GenCpm≤T_GenCpmMax), where T_GenCpmMin=100 ms and T_GenCpmMax=1000 ms, depending on the congestion situation on the wireless network.

When T_GenCpm time is elapsed, i.e. when the difference between the present time (denoted T_Now) and the time at which the last CPM was generated (denoted T_LastCpm) is equal to or larger than T_GenCpm, the next CPM generation event time (denoted T_GenEvent) is set to current time T_Now. Otherwise the next CPM generation event time T_GenEvent is the sum of T_LastCpm and T_GenCpm.

According to some embodiments, it may be suggested to set the latency reporting about safety-critical objects as low as possible. Accordingly, in response to the detection of safety-critical objects, T_GenCpm should be chosen in a range of values between T_GenCpmMinCritical=0 ms (or another value lower than current T_GenCpmMin) and T_GenCpmMaxCritical=100 ms (or another value lower than current T_GenCpmMax). The triggering of the CPM generation event T_GenEvent may be immediate or after the minimum time delay T_GenCpm elapsed from the last CPM generation event.

According to some embodiments, the detection of an event, which may constitute a safety risk for the area may trigger the CPM generation event. For example, such event may be the detection of a safety-critical object. In this case, the CPM generation event may be immediately triggered.

For example, when the safety-critical level of a marked object is higher than a threshold value (denoted SafetyCriticalLevel_Threshold) or when the safety-critical level of a marked object becomes higher than this threshold, the situation may be considered as an event constituting a safety risk.

For the subsequent inclusion request of already reported objects associated with a safety-critical level indicating a safety-critical situation in next CPMs, the minimum time elapsed between consecutive CPMs T_GenCpm may be set preferably in a range of values between T_GenCpmMinCritical and T_GenCpmMaxCritical. Accordingly, in a case of a safety-critical situation, objects concerned by this situation can be reported more frequently, for example every 10 ms.

According to some embodiments, in case of new detection of a safety-critical object, when this detection event triggers the CPM generation event, the CPM generation event time T_GenEvent is set to the current time T_Now. In this case the next CPM should be generated immediately for example because there is a new critical object.

In case where only non-safety-critical objects are perceived by the ITS-S, the current value of T_GenCpm to wait between two CPM generation events, is computed in accordance with standard TS 103 324 V0.0.22, and the next CPM generation event time T_GenEvent is the sum of T_LastCpm and T_GenCpm.

According to some embodiments, the value of T_GenEvent may be calculated, and stored in an embedded memory of the originating ITS-S.

After having computed the next CPM generation event time T_GenEvent, it is checked, at step 1807, whether the next CPM generation event time T_GenEvent is reached.

According to some embodiments, to do that, it may be checked whether T_Now reaches T_GenEvent or is greater than T_GenEvent.

For example, a stored valued of T_GenEvent is compared to T_Now, to determine for example if T_Now is lower than T_GenEvent. If T_Now is lower than T_GenEvent, meaning that T_GenEvent has not been reached, a waiting period is initiated, at step 1808, until T_Now reaches the value of the next T_GenEvent.

During this waiting period, as illustrated, steps 1802, 1805, 1806, as described hereinbefore are performed, in order to monitor the surrounding. This monitoring aims at detecting, during the wait, new objects or events in the monitored area, and/or updating the CPM generation time T_GenEvent if the safety-critical level of the detected objects changes or if a new safety-critical object is detected during the wait. The waiting period may vary when the value of T_GenEvent is updated.

When T_Now reaches T_GenEvent or is greater than T_GenEvent, the CPM generation is triggered.

According to some embodiments, to do that, a dedicated timer may be used, such that at the end of the dedicated timer from the T_LastCpm value with a duration of T_GenCpm, the next CPM generation event time T_GenEvent is set to the current time T_Now. When T_GenEvent is set to the current time T_Now, the CPM generation is triggered. Similarly to above, during the timer elapsing, a waiting period is initiated, at step 1808. During this waiting period, as illustrated, steps 1802, 1805, 1806, as described hereinbefore are performed, in order to monitor the surrounding.

As an alternative, in case of the detection of safety-critical objects, it may be checked whether the minimum time delay T_GenCpmMinCritical elapsed from the last CPM generation event (T_LastCpm) using a dedicated timer. Thus, at the end of the dedicated timer with a duration of T_GenCpmMinCritical, the next CPM generation event time T_GenEvent is set to the current time T_Now. In this case, it is considered that at the end of T_GenCpmMinCritical period, the next CPM should be generated immediately as sufficient time has elapsed since the last CPM generation. Similarly to above, during the timer elapsing, a waiting period is initiated, at step 1808. During this waiting period, as illustrated, steps 1802, 1805, 1806, as described hereinbefore are performed, in order to monitor the surrounding.

When T_Now reaches T_GenEvent, next the perceived object containers 370 of the marked objects, at step 1810, and the perceived object containers of the marked groups of objects, at step 1815, are generated.

According to this embodiment, the selection of marked objects and the corresponding type of reporting, i.e. individually or as a group, may take into account the safety-critical categorization information of the detected objects, as described in step 1110 and 1115 of FIG. 11 and in more details in relation to FIGS. 12, 13 and 14.

The inclusion conditions based on TS 103 324 V0.0.22 may be modified in order to take into consideration the safety-critical level of the marked objects. Thus, an object with sufficient confidence level should be included in the next CPM to be transmitted if the safety-critical level is higher than the threshold value SafetyCriticalLevel_Threshold and if the time elapsed since the last time the object was included in a CPM exceeds T_GenCpmMaxCritical.

According to some embodiments, a detected object should be individually reported in the next CPM to be transmitted when the detected object is considered as a safety-critical i.e. with safety-critical object a level higher than SafetyCriticalLevel_Threshold. In other words, independently of the type of the detected object, even of the VRU type, the detected object considered as a safety-critical object is reported individually and not in a group, e.g. a VRU group.

Then, at steps 1820, 1830 and 1840, the CPM is generated and transmitted, similarly to the steps 520, 530 and 540 as described hereinbefore with respect to FIG. 5. When the CPM is generated (step 1820), the T_LastCpm value is set to the T_GenEvent value.

In this embodiment, the certificate given by the specific certification authority and included within the CPM at step 1830, includes the permission to authorise the report of a safety information in CPM as described with reference to FIG. 4.

Optionally, before the generation of the object containers of the marked objects and the marked groups of objects at steps 1810, 1815, it may be contemplated applying mechanisms preventing to report a detected object which has been previously reported. For example, it may be contemplated applying redundancy mitigation technics.

For instance, objects which have already been reported recently by other ITS-S can be removed from the list of the marked objects to be reported in the next CPM.

However, an object associated with a safety-critical level higher than the threshold SafetyCriticalLevel_Threshold should not be subject to redundancy mitigation techniques (1809). In other words, regardless of whether it has already been reported by the same or by other ITS-S, an object should be included in the next CPM to be transmitted if its safety-critical level is higher than SafetyCritical Level_Threshold. Therefore, for such safety-critical objects, redundancy mitigation technics are disabled.

Such redundancy mitigation technics may reduce the number of marked perceived objects and/or marked groups of objects to be reported in the next CPM to be transmitted. It may be useful to limit the risk of bandwidth congestion by decreasing the size and number of CPMs to be transmitted.

The described methods, together with the reporting rules, are implemented by a ITS-S, configured to implement such methods and rules.

Figure 17:
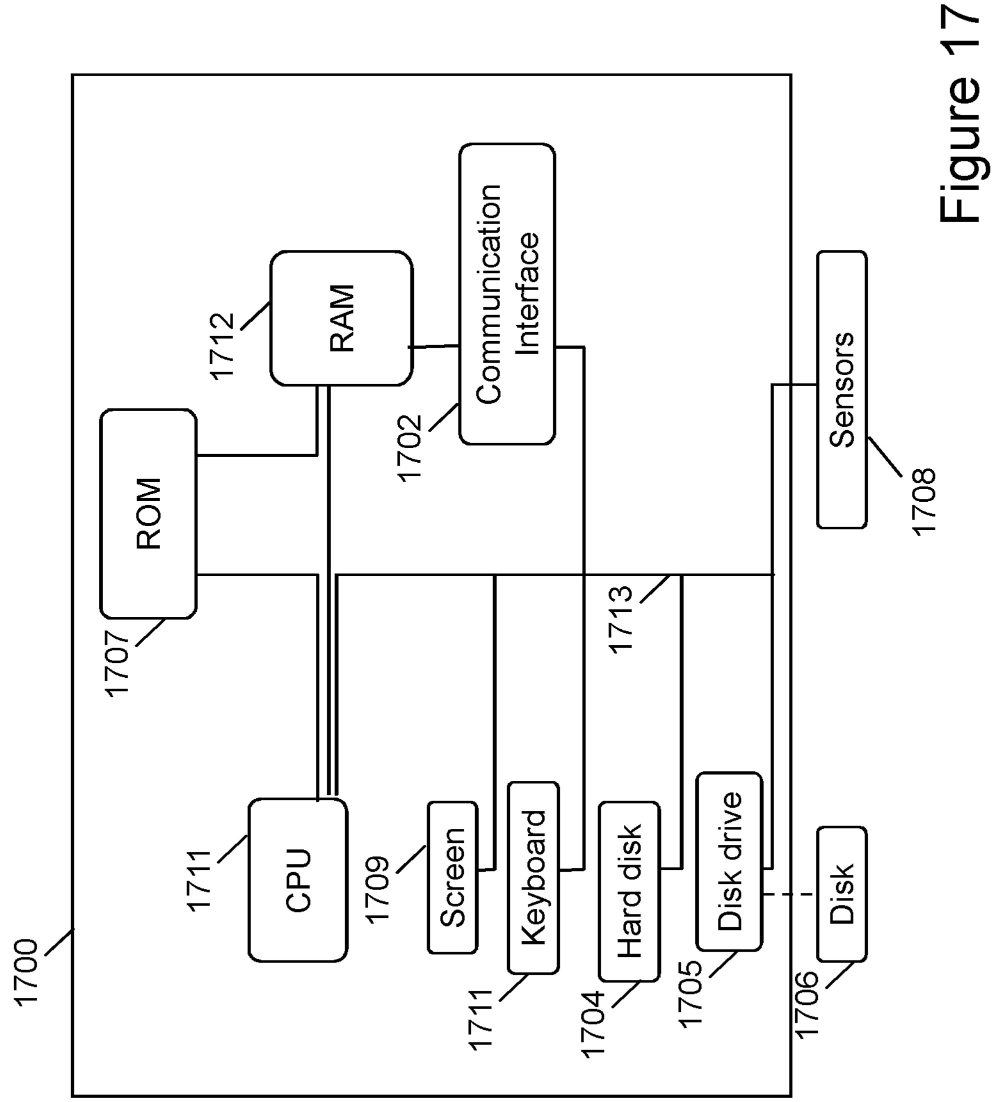
FIG. 17 shows a schematic representation an example of a communication device configured to implement embodiments of the present invention.

An example of ITS-S is described with reference to FIG. 17, which may be either a ITS-S embedded in a vehicle, on or in a VRU, or in a road side entity 120.

The communication device 1700 may preferably be a device such as a micro-computer, a workstation or a light portable device. The communication device 1700 comprises a communication bus 1713 to which there are preferably connected:

- a central processing unit 1711, such as a microprocessor, denoted CPU;
- a read only memory 1707, denoted ROM, for storing computer programs for implementing the invention;
- a random access memory 1712, denoted RAM, for storing the executable code of methods according to embodiments of the invention as well as the registers adapted to record variables and parameters necessary for implementing methods according to embodiments of the invention; and
- at least one communication interface 1702 connected to the radio V2X communication network over which ITS messages are transmitted. The ITS messages are written from a FIFO sending memory in RAM 1712 to the network interface for transmission or are read from the network interface for reception and writing into a FIFO receiving memory in RAM 1712 under the control of a software application running in the CPU 311.

Optionally, the communication device 1700 may also include the following components:

- a data storage means 1704 such as a hard disk, for storing computer programs for implementing methods according to one or more embodiments of the invention;
- a disk drive 1705 for a disk 1706, the disk drive being adapted to read data from the disk 1706 or to write data onto said disk;
- a screen 1709 for serving as a graphical interface with the user, by means of a keyboard 1710 or any other pointing means.

The communication device 1700 may be optionally connected to various peripherals including perception sensors 1708, such as for example a digital camera, each being connected to an input/output card (not shown) so as to supply data to the communication device 1700.

Preferably the communication bus provides communication and interoperability between the various elements included in the communication device 1700 or connected to it. The representation of the bus is not limiting and in particular the central processing unit is operable to communicate instructions to any element of the communication device 1700 directly or by means of another element of the communication device 1700.

The disk 1706 may optionally be replaced by any information medium such as for example a compact disk (CD-ROM), rewritable or not, a ZIP disk, a USB key or a memory card and, in general terms, by an information storage means that can be read by a microcomputer or by a microprocessor, integrated or not into the apparatus, possibly removable and adapted to store one or more programs whose execution enables a method according to the invention to be implemented.

The executable code may optionally be stored either in read only memory 1707, on the hard disk 1704 or on a removable digital medium such as for example a disk 1706 as described previously. According to an optional variant, the executable code of the programs can be received by means of the communication network 1703, via the interface 1702, in order to be stored in one of the storage means of the communication device 1700, such as the hard disk 1704, before being executed.

The central processing unit 1711 is preferably adapted to control and direct the execution of the instructions or portions of software code of the program or programs according to the invention, which instructions are stored in one of the aforementioned storage means. On powering up, the program or programs that are stored in a non-volatile memory, for example on the hard disk 1704 or in the read only memory 1707, are transferred into the random access memory 1712, which then contains the executable code of the program or programs, as well as registers for storing the variables and parameters necessary for implementing the invention.

In a preferred embodiment, the apparatus is a programmable apparatus which uses software to implement the invention. However, alternatively, the present invention may be implemented in hardware (for example, in the form of an Application Specific Integrated Circuit or ASIC).

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular, the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method for transmitting a Collective Perception Message, CPM, the method being intended for an Intelligent Transport System, ITS, comprising at least one originating ITS station, ITS-S, the method comprising the following steps, at the at least one originating ITS-S:

transmitting a CPM reporting information related to at least one object detected within an area monitored by the originating ITS-S;

wherein the reported information comprises a safety-critical categorization information, indicating whether the detected object is critical for the safety of the monitored area, wherein the safety-critical categorization information comprises a safety-critical level; and disabling any mechanism preventing a detected object associated with a safety-critical level higher than a corresponding safety-critical level threshold from being reported in the CPM.

2. The method of claim 1, wherein the detected object is reported individually when the detected object is categorized as critical for the safety of the monitored area.

3. The method of claim 2, wherein the CPM comprises a data element that is a Perceived Object Container, configured to contain information related to either the individually reported object or the group of detected objects comprising the reported object.

4. The method of claim 3 wherein the Perceived Object Container comprises a data field dedicated to indicate safety-critical categorization information of either the individually reported object or the group of detected objects comprising the reported object.

5. The method of claim 1, wherein previously to the transmitting step, the method comprises, when the detected object is not categorized as critical for the safety of the monitored area:

determining whether the detected object may be reported with at least one another detected object not categorized as critical for the safety of the monitored area thereby forming a group of detected objects, according to predefined grouping rules;

wherein the CPM reporting information related to the detected object is reported within said group, according to the determining step.

6. The method of claim 1, wherein previously to the transmitting step, the method comprises:

determining the safety-critical categorization information of the detected object;

determining at least one another detected object with which the detected object may be reported according to predefined grouping rules, wherein the at least one another detected object is associated with a safety-critical categorization information identical to the determined safety-critical categorization information of the detected object.

7. The method of claim 1, wherein previously to the transmitting step, the method comprises:

determining the safety-critical categorization information of the detected object, wherein the safety-critical categorization information comprises a safety-critical level;

determining whether the safety-critical level of the detected object is higher than a corresponding safety-critical level threshold;

if the safety-critical level of the detected object is higher than the corresponding safety-critical level threshold, decreasing a minimum time elapsing between two consecutive CPM generation events.

8. The method of claim 1, wherein previously to the transmitting step, the method comprises:

determining an event constituting a safety risk for the monitored area;

wherein in response to the detection of the event, triggering the transmitting step.

9. The method of claim 1, wherein the method further comprises:

reporting the at least one detected object with at least one another detected object thereby forming a group of detected objects;

wherein all the objects reported within a group of detected objects are categorized as not critical for the safety.

10. The method of claim 1, wherein the safety-critical categorization information is a one-bit flag set to 1 when the object is categorized as critical for the safety of the monitored area and set to 0 otherwise.

11. The method of claim 1, wherein previously to the transmitting step, the method comprises:

selecting among the objects detected by the originating ITS-S, the objects to be reported within the CPM to be transmitted;

wherein the CPM reports information related to each selected object.

12. The method of claim 11, wherein the selecting step comprises, for each detected object:

obtaining a current safety-critical categorization information of the detected object;

retrieving a former safety-critical categorization information of the detected object, previously sent in a previous CPM;

selecting the detected object when the current safety-critical categorization information is different from the former safety-critical categorization information.

13. The method of claim 12, wherein the former safety-critical categorization information and the current safety-critical categorization information are the same, and further comprising:

retrieving a former value of at least one reported parameter of the detected object, previously sent in a previous CPM;

obtaining a current value of the reported parameter of the detected object;

selecting the detected object when the difference between the current value and the former value of the reported parameter is greater than a predefined threshold.

14. The method of claim 13, wherein the reported parameter is one among a position, a speed or an acceleration relatively to the originating station.

15. The method of claim 11, wherein the selected object is one among a Vulnerable Road User, VRU, or a vehicle.

16. A non-transitory computer-readable medium storing a program comprising a sequence of instructions for implementing a method according to claim 1.

17. An originating ITS station, ITS-S, within an Intelligent Transport System, ITS, the originating ITS-S comprising:

one or more embedded sensors, configured to monitor a given area in order to detect objects;

an analytical module configured to process data provided by the sensors in order to provide a list of detected objects in the monitored area;

a safety-critical categorization module configured to process the list of detected objects in order to provide a safety-critical categorization information related to each detected object, wherein the safety-critical categorization information comprises a safety-critical level;

a communication module configured to transmit a Collective Perception Message, CPM, comprising information related to at least one of the detected objects in the monitored area, wherein the information related to at least one of the detected objects comprises the associated safety-critical categorization information provided by the safety-critical categorization module; and disabling any mechanism preventing a detected object associated with a safety-critical level higher than a corresponding safety-critical level threshold from being reported in the CPM.

18. A method for processing a Collective Perception Message, CPM, the method being intended for an Intelligent Transport System, ITS, comprising at least one originating ITS station, ITS-S, and at least one receiving ITS-S, the method comprising the following steps, at the at least one receiving ITS-S:

receiving a CPM reporting information related to at least one object detected within an area monitored by the originating ITS-S;

retrieving, from the reported information, a safety-critical categorization information, indicating whether the object is critical for the safety of the monitored area, wherein the safety-critical categorization information comprises a safety-critical level;

determining whether the object is categorized as critical for the safety of the monitored area; and disabling any mechanism preventing a detected object associated with a safety-critical level higher than a corresponding safety-critical level threshold from being reported in the CPM.

19. The method of claim 18, wherein the at least one object is reported with at least one another detected object thereby forming a group of detected objects;

categorizing as not critical for the safety of the monitored area all detected objects that belong to the group.

20. A receiving ITS station, ITS-S, within an Intelligent Transport System, ITS, the receiving ITS-S comprising at least one microprocessor configured to performed the method according to claim 18.

21. A method for processing a Collective Perception Message, CPM, the method being intended for an Intelligent Transport System, ITS, comprising at least one originating ITS station, ITS-S, and at least one receiving ITS-S, the method comprising the following steps, at the at least one receiving ITS-S:

receiving a CPM reporting information related to at least one object detected within an area monitored by the originating ITS-S, wherein the at least one object is reported with at least one another detected object thereby forming a group of detected objects;

retrieving from the reported information a safety-critical categorization information common to all the objects of the group of detected objects, indicating whether the group of detected objects is categorized as critical for the safety of the monitored area, wherein the safety-critical categorization information comprises a safety-critical level; and disabling any mechanism preventing a detected object associated with a safety-critical level higher than a corresponding safety-critical level threshold from being reported in the CPM.

* * * * *